Nov. 21, 1950  H. GANG  2,531,206
MULTIPLIER ENTERING MEANS
Filed Feb. 16, 1948  21 Sheets-Sheet 1

WITNESS:
George V. Hall

INVENTOR
Herman Gang
BY
Stuart Hilder
ATTORNEY

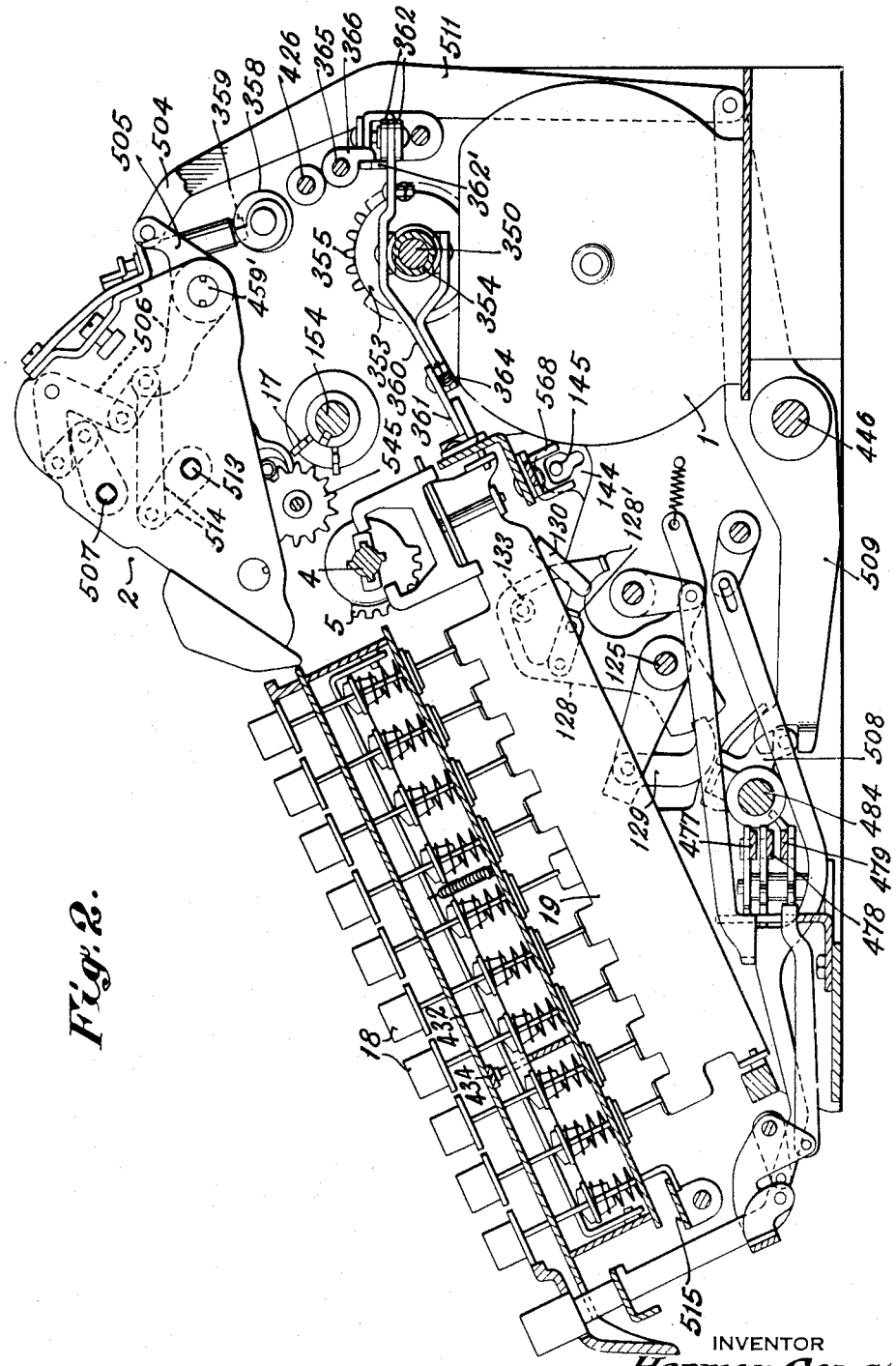

Nov. 21, 1950     H. GANG     2,531,206
MULTIPLIER ENTERING MEANS
Filed Feb. 16, 1948     21 Sheets-Sheet 3
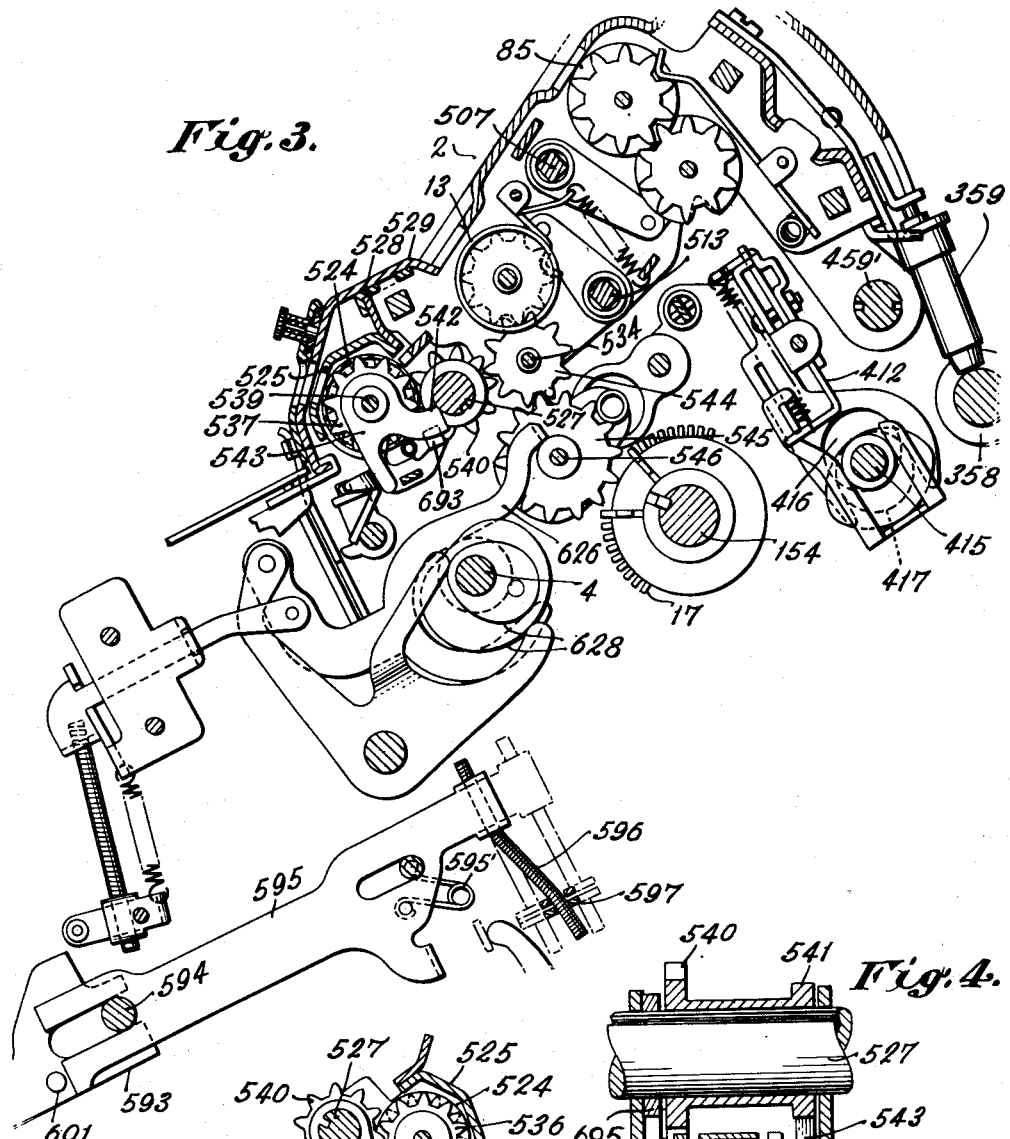
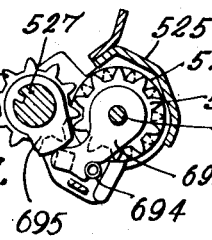
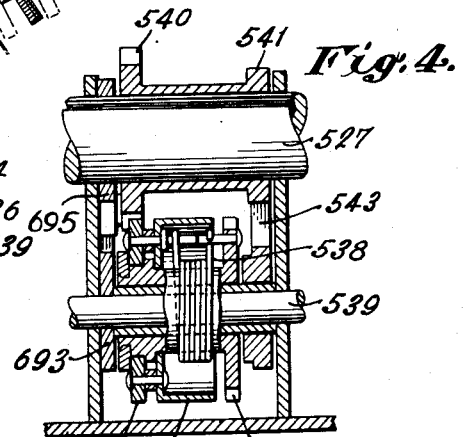
INVENTOR
Herman Gang
BY Stuart Hilder
ATTORNEY
WITNESS:
George V. Hall

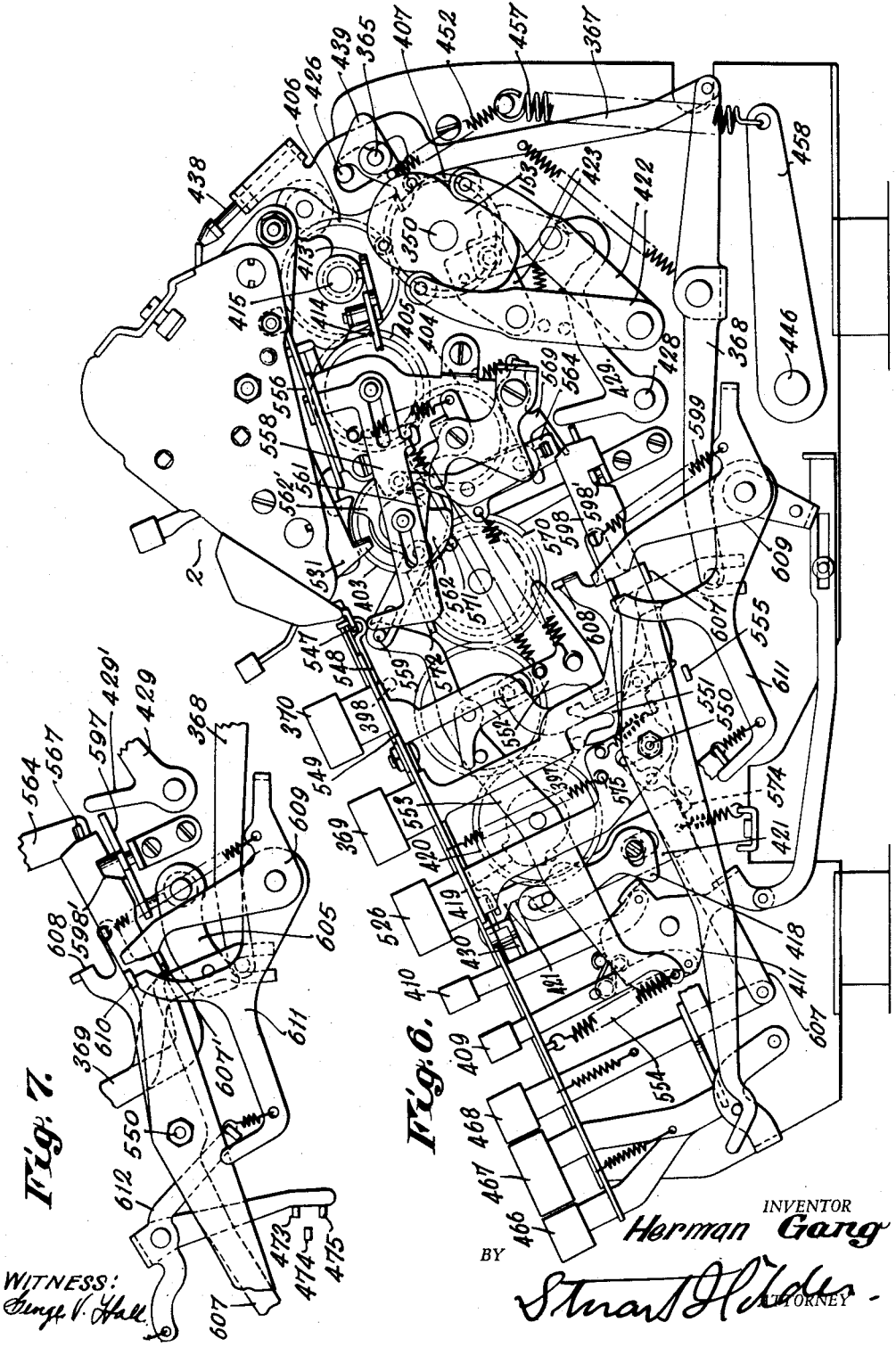

Nov. 21, 1950  H. GANG  2,531,206
MULTIPLIER ENTERING MEANS
Filed Feb. 16, 1948  21 Sheets-Sheet 5
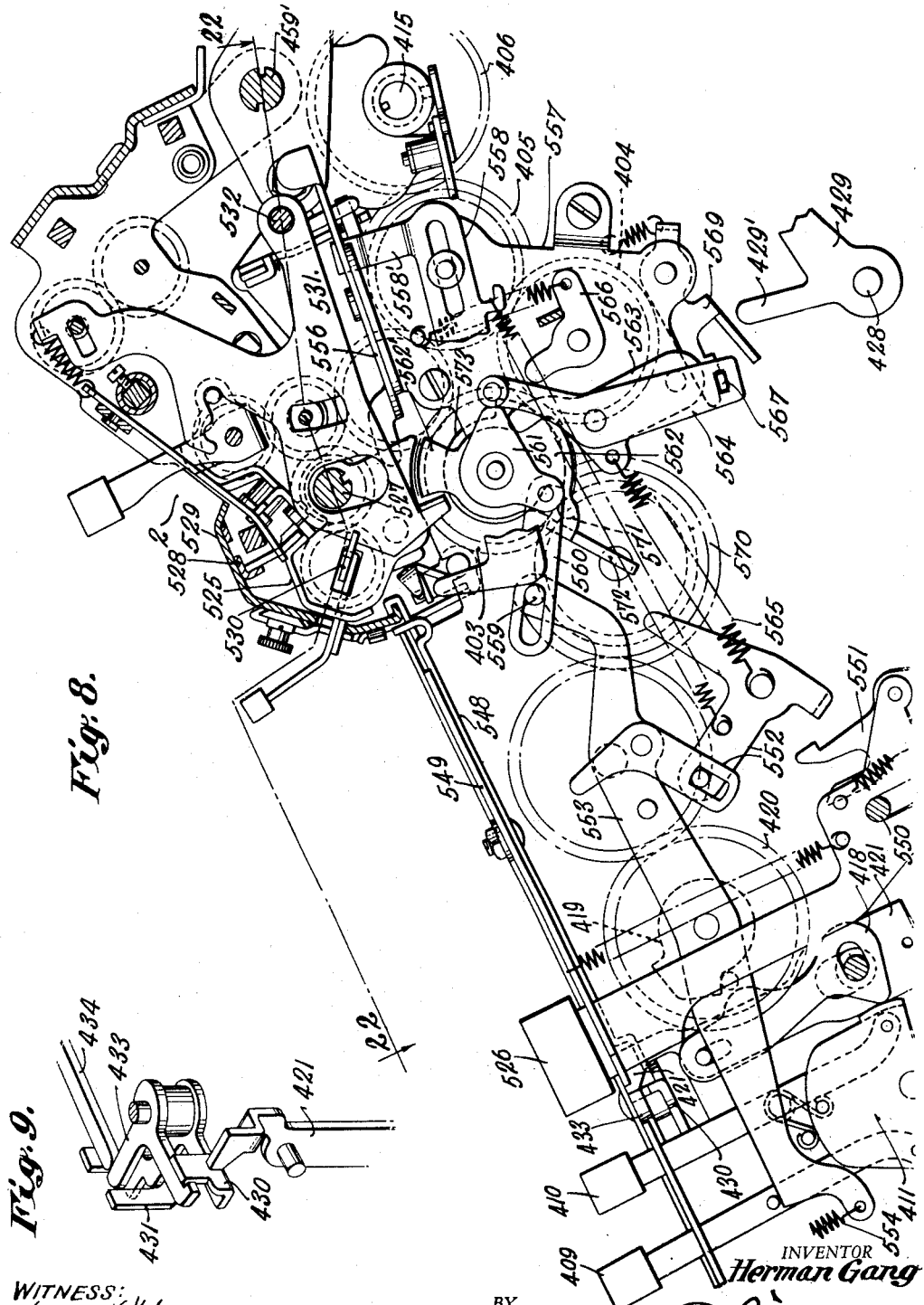

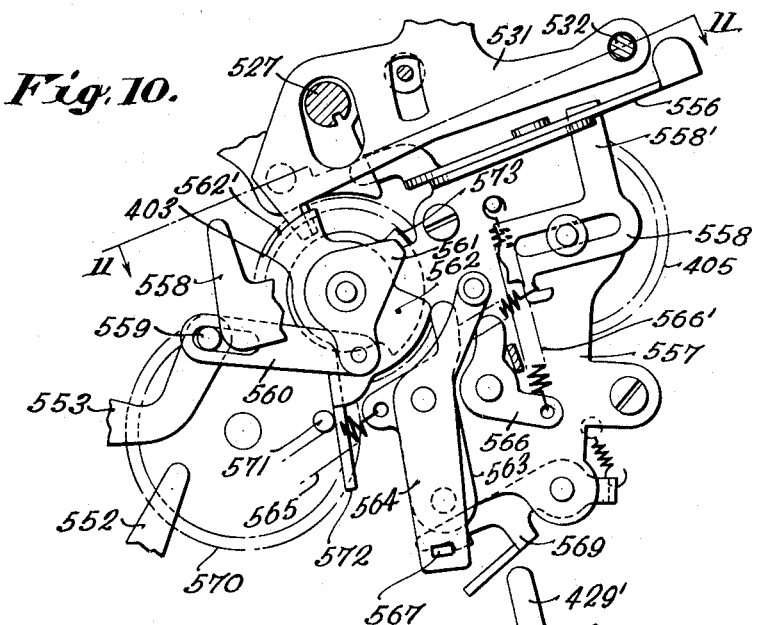
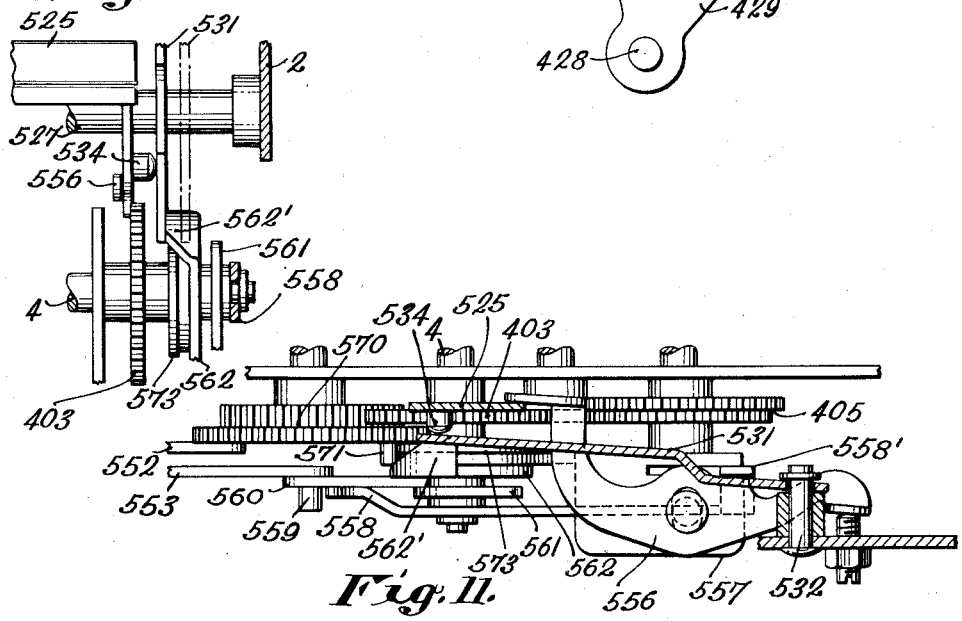

Nov. 21, 1950  H. GANG  2,531,206
MULTIPLIER ENTERING MEANS
Filed Feb. 16, 1948  21 Sheets-Sheet 7

WITNESS:
George V. Hall

INVENTOR.
Herman Gang
BY
Stuart Wilder
ATTORNEY

Nov. 21, 1950     H. GANG     2,531,206
MULTIPLIER ENTERING MEANS
Filed Feb. 16, 1948     21 Sheets-Sheet 8
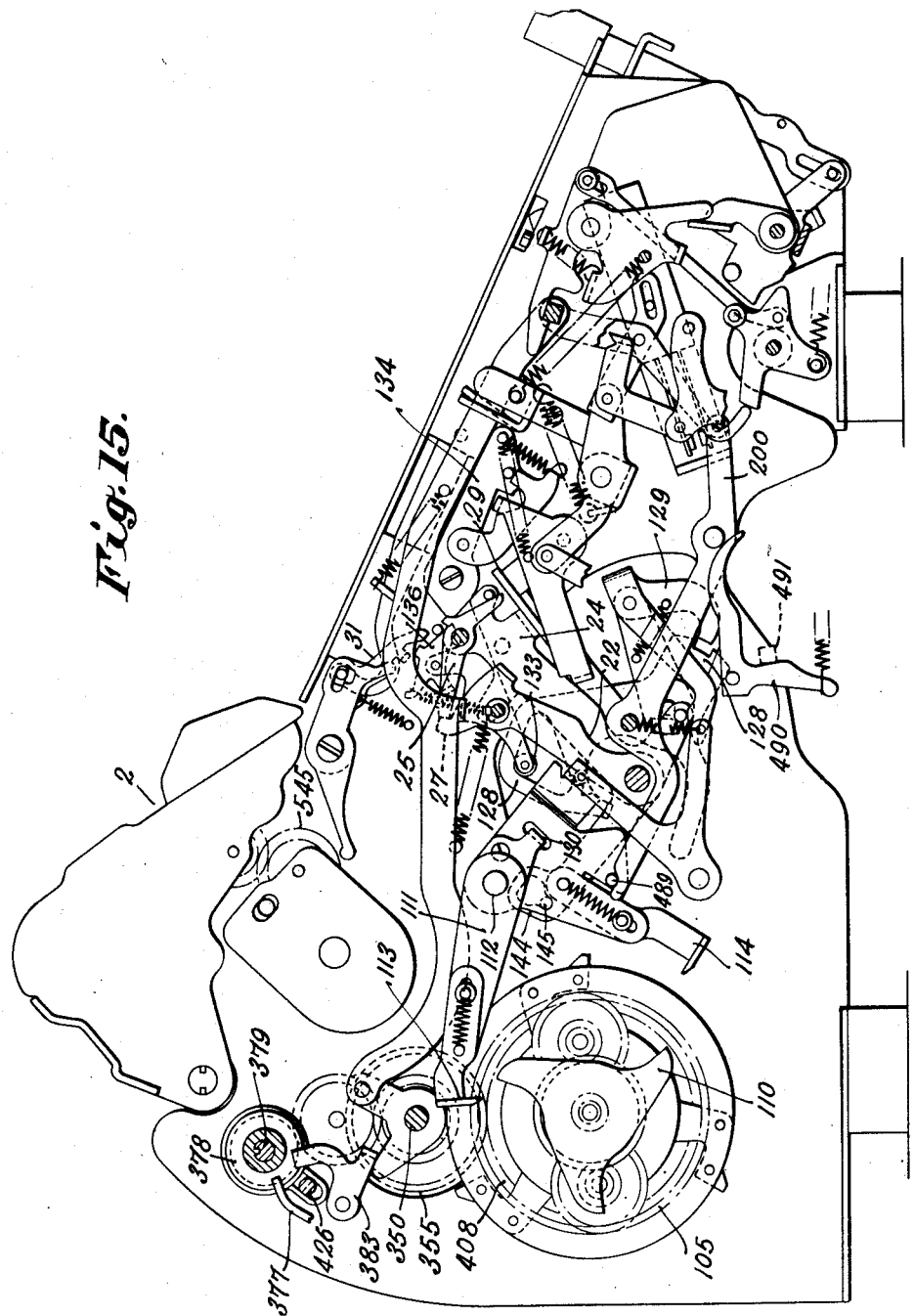

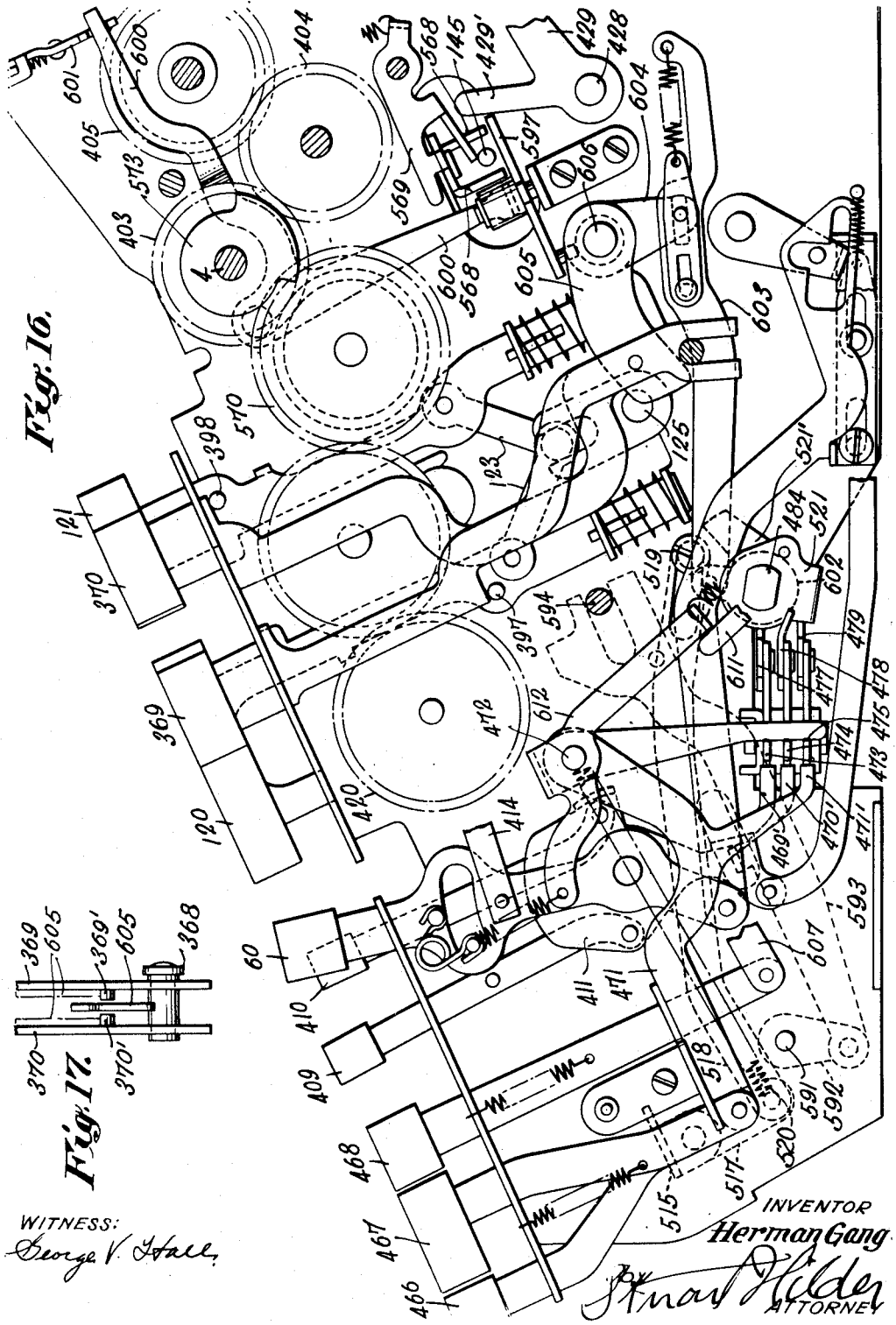

Nov. 21, 1950     H. GANG     2,531,206
MULTIPLIER ENTERING MEANS

Filed Feb. 16, 1948     21 Sheets-Sheet 10

WITNESS:
George V. Hall

INVENTOR
Herman Gang
BY
Stuart Hilder
ATTORNEY

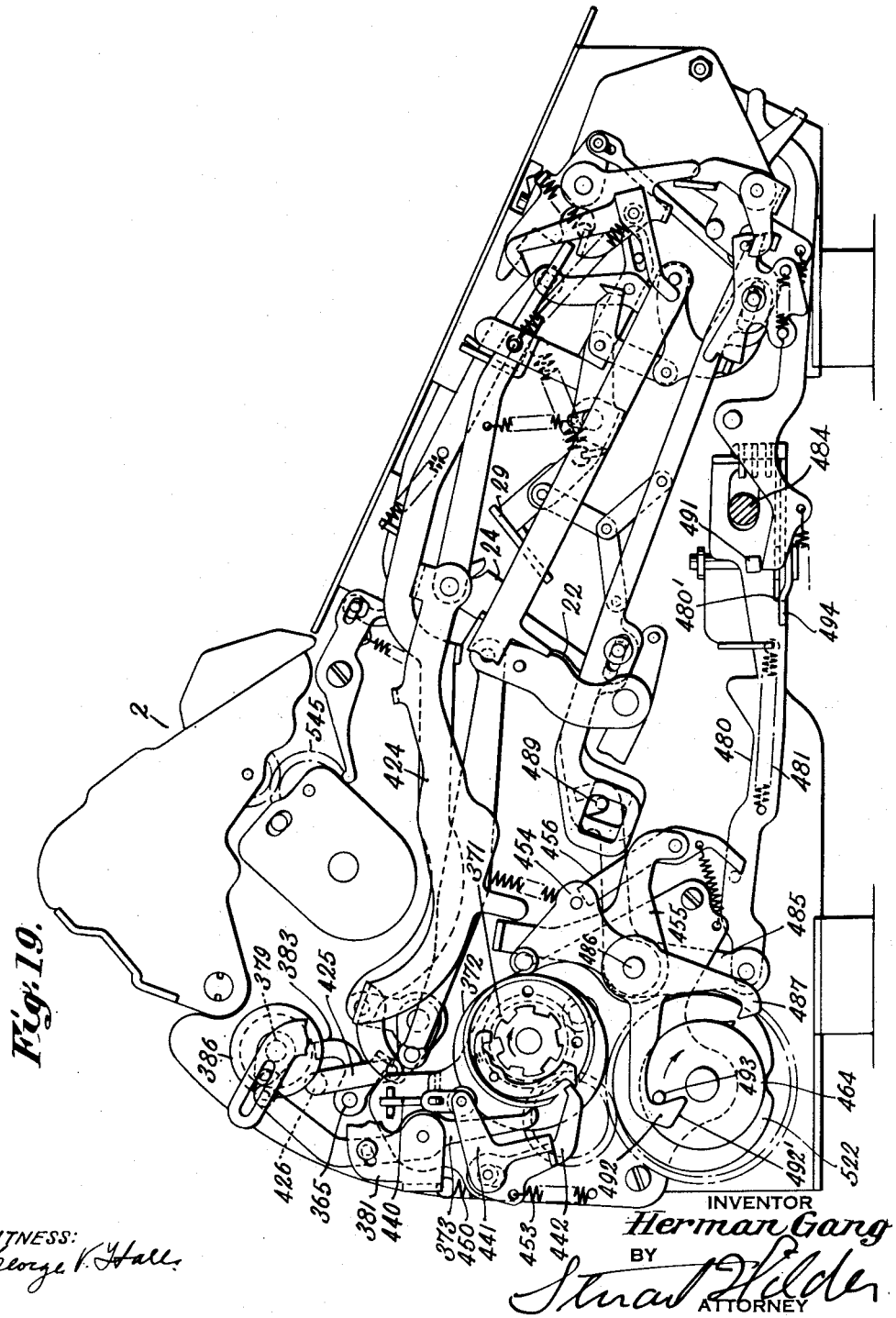

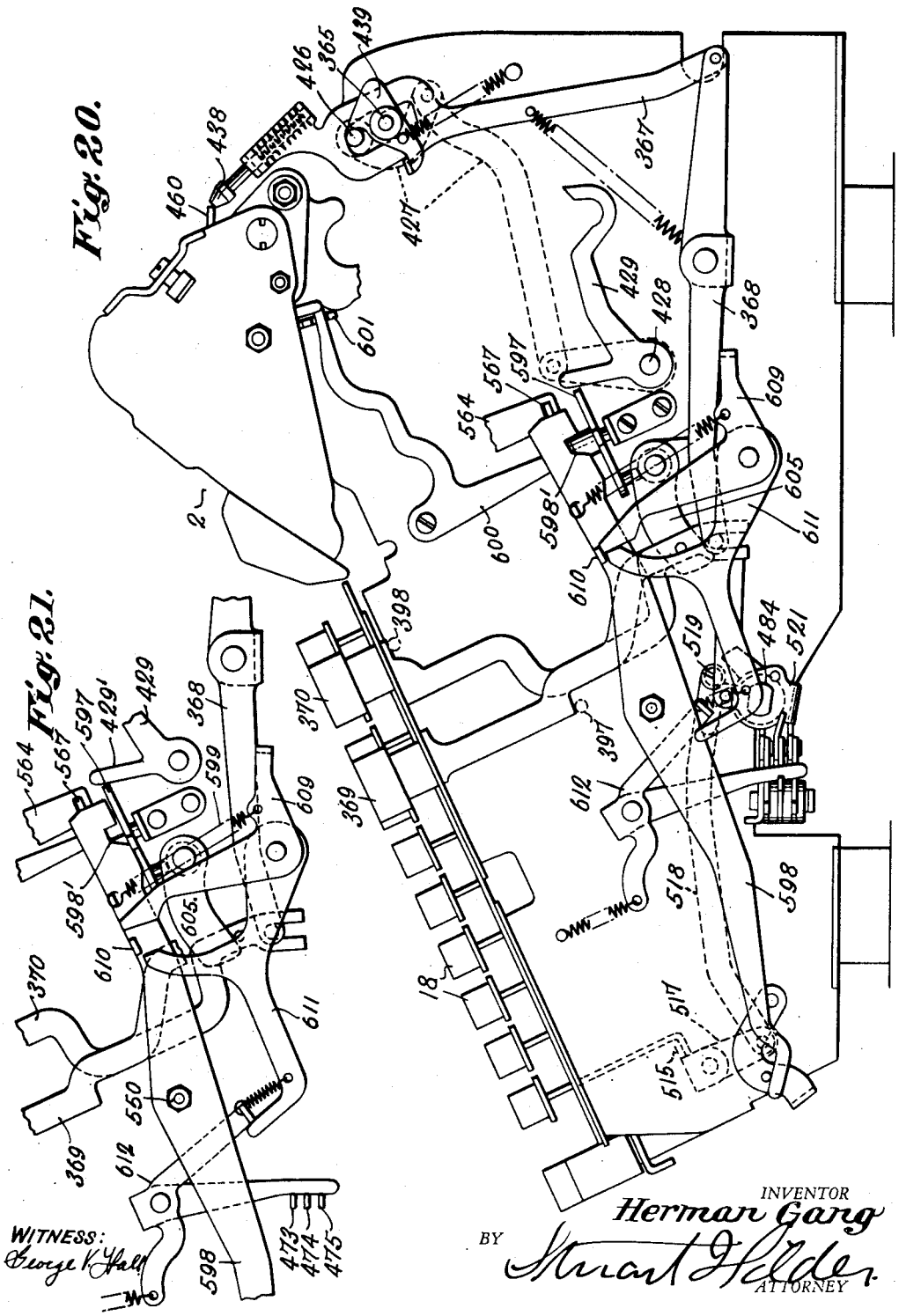

Nov. 21, 1950          H. GANG          2,531,206

MULTIPLIER ENTERING MEANS

Filed Feb. 16, 1948          21 Sheets-Sheet 13

INVENTOR
*Herman Gang*
BY *Stuart Wilder*
ATTORNEY

WITNESS:
*George V. Hall*

Nov. 21, 1950   H. GANG   2,531,206
MULTIPLIER ENTERING MEANS
Filed Feb. 16, 1948   21 Sheets-Sheet 14
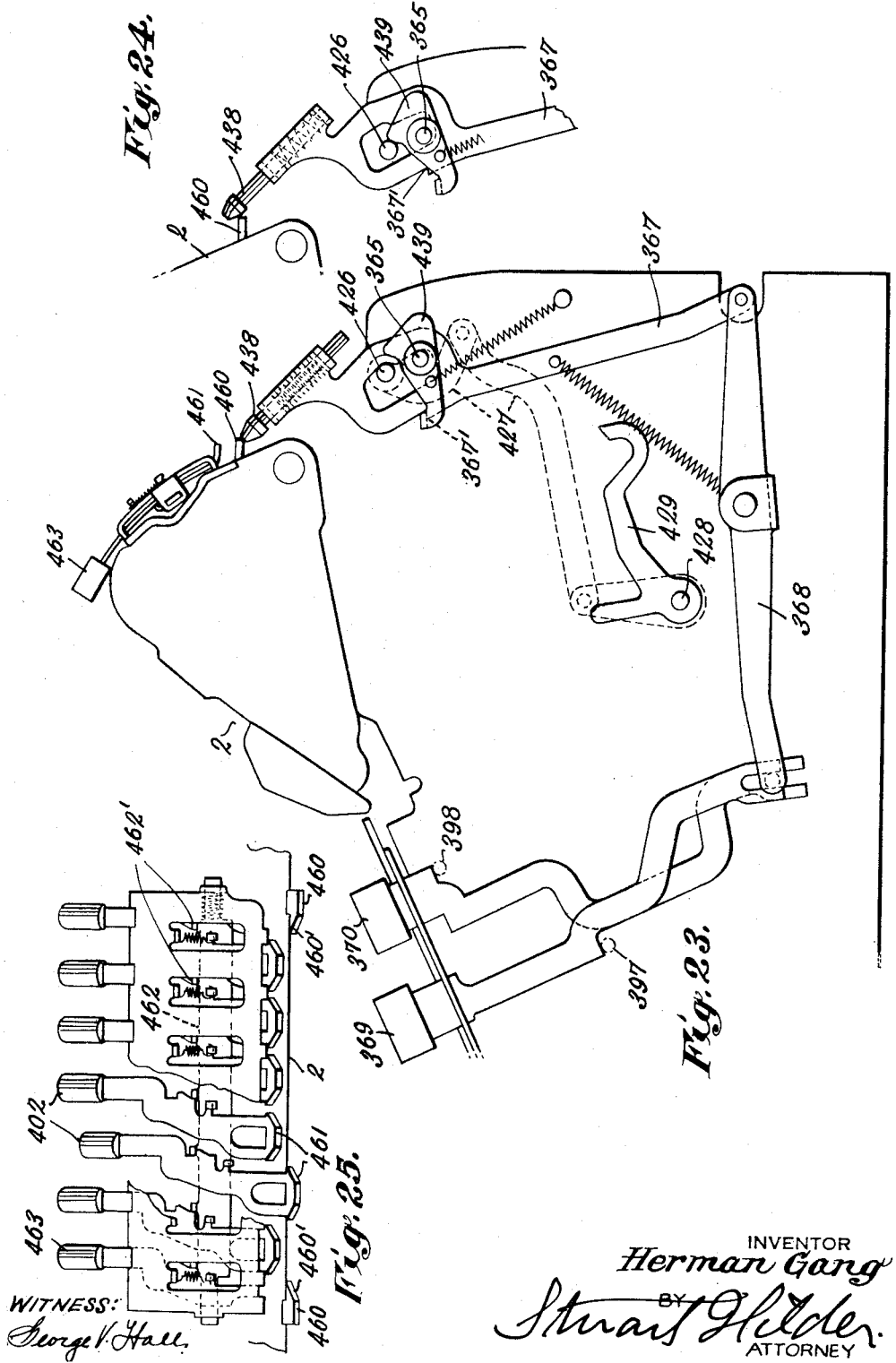
INVENTOR
Herman Gang
BY Stuart G. Hilder
ATTORNEY
WITNESS:
George V. Hall

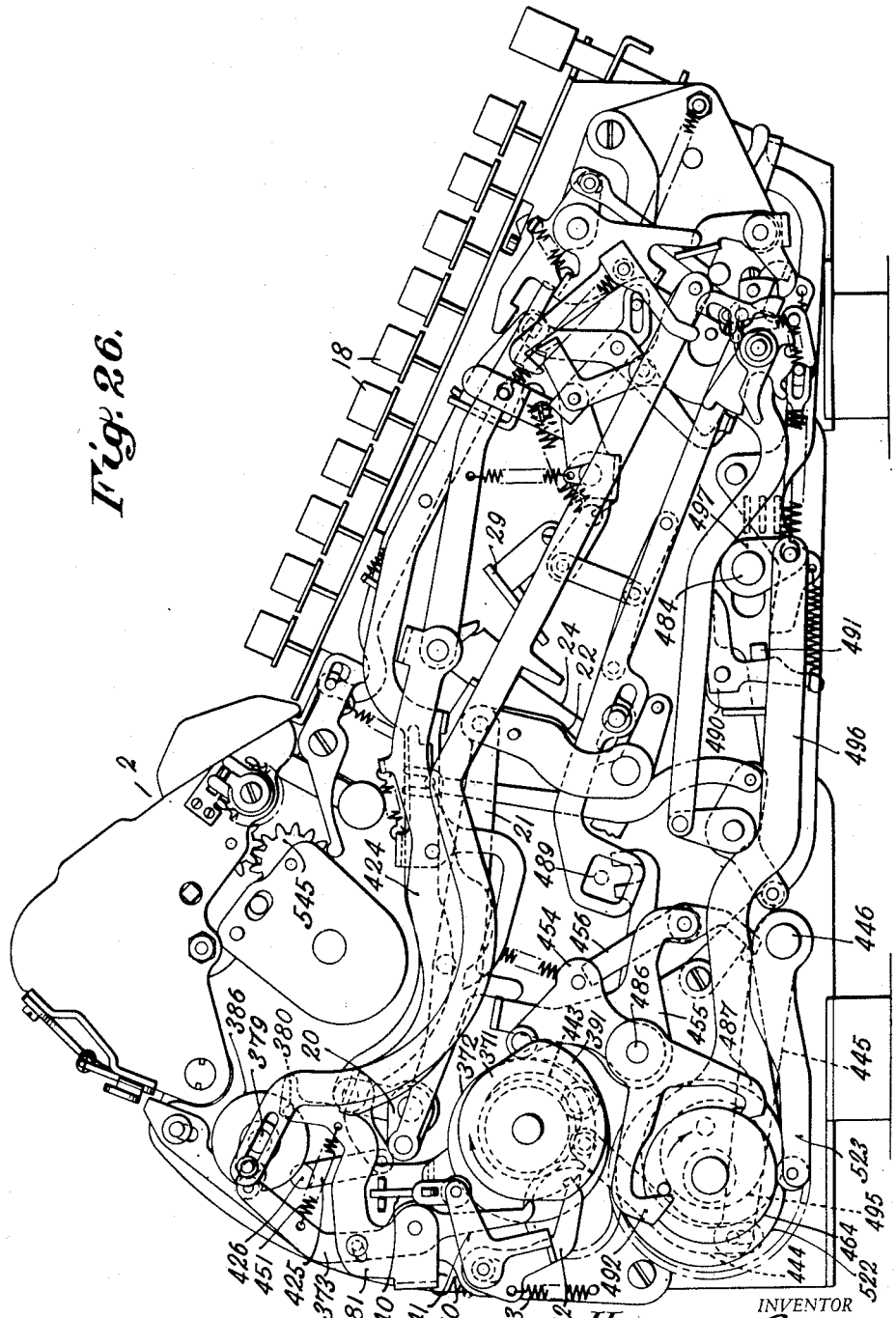

Nov. 21, 1950  H. GANG  2,531,206
MULTIPLIER ENTERING MEANS

Filed Feb. 16, 1948  21 Sheets-Sheet 20

WITNESS:
George V. Hall

INVENTOR
Herman Gang
BY Stuart Hilder
ATTORNEY

Nov. 21, 1950  H. GANG  2,531,206
MULTIPLIER ENTERING MEANS
Filed Feb. 16, 1948  21 Sheets-Sheet 21
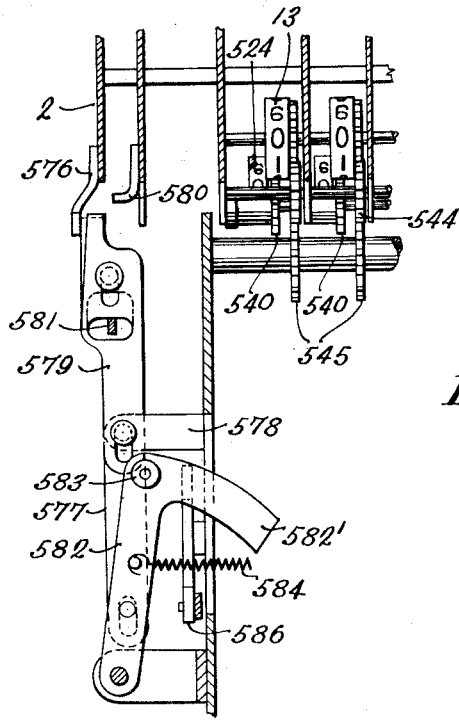
Fig. 33.
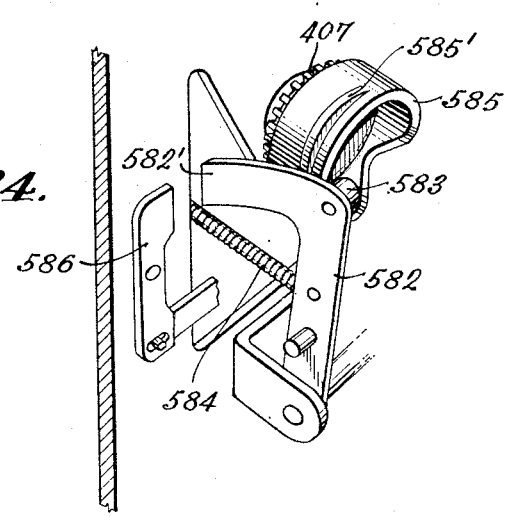
Fig. 34.
Fig. 35.
WITNESS
George V. Hall
INVENTOR
Herman Gang
BY
Stuart Holde
ATTORNEY Patented Nov. 21, 1950

2,531,206

UNITED STATES PATENT OFFICE 2,531,206

MULTIPLIER ENTERING MEANS

Herman Gang, Livingston, N. J., assignor to Monroe Calculating Machine Company, Orange, N. J., a corporation of Delaware Application February 16, 1948, Serial No. 8,547

12 Claims. (Cl. 235—63)

The invention relates to means whereby a multiplier value, set in the keyboard of a calculating machine, may be set up as an operation controlling factor by entering such value in a set of multiplier storage wheels. According to one form of the invention the multiplier entering means is alternatively operable to enter a dividend value, set in the keyboard, into a product-dividend register.

The invention consists in the novel construction and combination of parts, as set forth in the appended claims.

In the accompanying drawings, illustrating an embodiment of the invention:

Fig. 2 is a vertical section showing the keyboard for selecting a value, and a portion of the carriage shift mechanism;

Fig. 3 is a vertical section through the main carriage showing the multiplier storage devices mounted therein, and the counting fingers for the storage devices and the multiplier-quotient register;

Fig. 4 is an enlarged detailed horizontal section of one of the multiplier storage wheels and gears;

Fig. 5 is a vertical section through the subcarriage showing the pawls for holding the multiplier storage wheels and gears in adjusted position and cams for releasing the pawls;

Fig. 6 is a right side elevation of the machine showing portions of the two cycle set up mechanism and controls therefore;

Fig. 7 is a fragmentary detailed view showing certain of the parts illustrated in Fig. 6 in an operated position;

Fig. 8 is an enlarged detailed right side elevation with the main carriage in section showing certain of the parts of the two cycle setup mechanism in an operated position;

Fig. 9 is a perspective showing a portion of the machine tripping and keyboard clearing control mechanism;

Fig. 10 is a fragmentary right side elevation showing certain of the parts illustrated in Fig. 8 in another operated position;

Fig. 11 is a section taken substantially on the line 11—11 of Fig. 10;

Fig. 12 is an end elevation of the parts shown in Fig. 12 as viewed from the left;

Fig. 15 is a left side elevation of the machine showing in part the differential drive mechanism and controls therefore;

Fig. 16 is an enlarged right side elevation showing portions of the controls for the clearout mechanism and controls for the carriage return mechanism;

Fig. 17 is a detailed elevation of the carriage shift key stems as viewed from the left;

Fig. 19 is a left side elevation of the machine showing the clearout clutch and the two phase carriage shift control clutch and various mechanisms associated therewith;

Fig. 20 is a right side elevation of the machine showing portions of the carriage return control devices in an operated position;

Fig. 21 is a fragmentary side elevation of certain of the parts shown in Fig. 20 in another operated position;

Fig. 23 is a right side elevation of the carriage shift and tabulating keys and certain mechanism associated therewith;

Fig. 24 is a fragmentary view showing certain parts illustrated in Fig. 23 in another position;

Fig. 25 is a rear elevation of the tabulating keys;

Fig. 26 is a left side elevation of the machine showing the various parts in their normal position;

Fig. 33 is a view taken on the line 33—33 of Fig. 32;

Fig. 34 is a perspective showing portions of the one cycle setup mechanism;

Fig. 35 is a view of the carriage shift worm.

Figure 1:
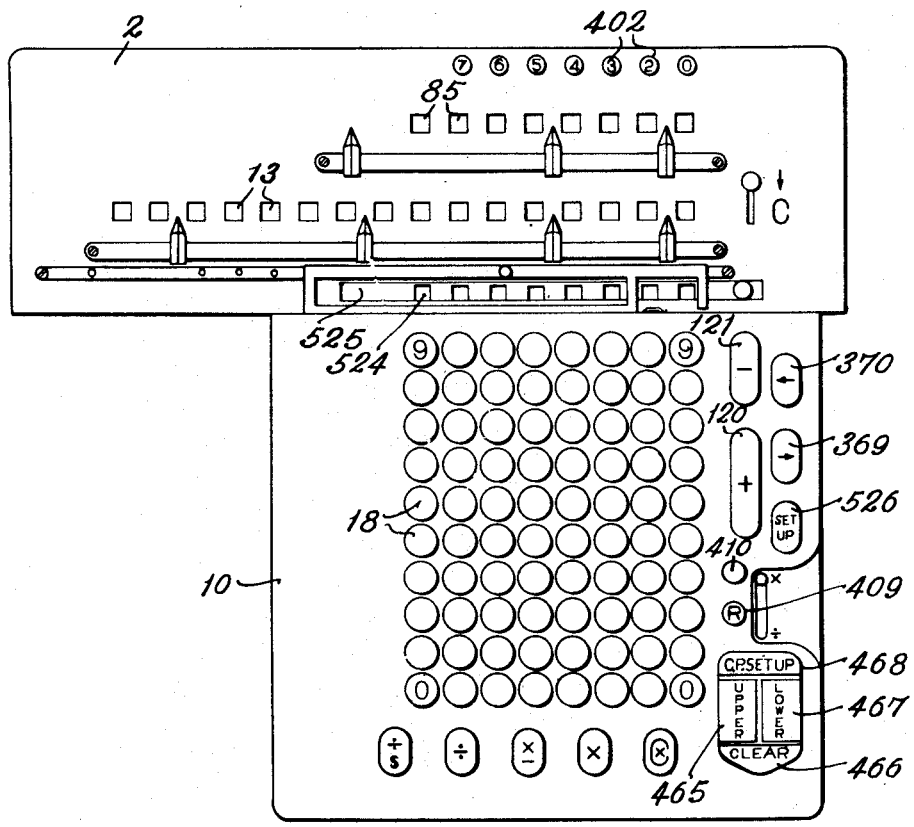
Fig. 1 is a plan view of a calculating machine built in accordance with the invention.

From an inspection of Fig. 1, it will be seen that the machine herein disclosed includes the usual keyboard 10 and a main carriage transversely shiftable relatively thereto. As will be noted, several of the control keys are grouped on the keyboard to facilitate simultaneous depression whereby to initiate certain machine operations hereinafter described.

Mounted in the main carriage are a product dividend register comprising numeral wheels 13, multiplier quotient wheels 85 and a subcarriage 525 longitudinally shiftable relatively thereto and including multiplier storage wheels 524. Tabulating stop keys 402 which serve to terminate a carriage shift intermediate the two extreme positions are located on the rear of the main carriage.

REGISTERING MECHANISM

Amounts set up on differential actuating gears 5 (Figs. 1, 2 and 3) by means of keys 18 and setting bails 19 are registered upon the numeral wheels 13 either additively or subtractively according to the direction of rotation of the actuator shaft 4 and the shaft 154 upon which the tens carry members 17 are mounted.

Differential gear shaft 4 and shaft 154 upon which the tens carry members are mounted are driven at a 1 to 1 ratio through a gear train (Figs. 6 and 8) comprising gears 403, 404, double gear 405, and gears 406, 407. Gear 407 is fast upon shaft 350 (Figs. 6 and 13) which is driven through friction clutch 352, the driving element of which is connected to the driving element of a second friction clutch 353 by a sleeve 354 so that they are rotated as a unit. The driving elements of the clutches 352 and 353 are connected to the output gear 408 (Figs. 13 and 15) of a differential gear drive from an electric motor 1 by means of a gear 355 secured to the driving member of the clutch 353. Clutch 352 is normally engaged and clutch 353 disengaged. However clutch 352 is disengaged and clutch 353 engaged to complete the drive to a carriage shift worm 358 as will be hereinafter described.

Normally the gearing comprising both working legs of the differential drive (Fig. 15) rotate idly as described in Patent No. 1,566,650; interruption of the movement of one leg causing the planet gears to move in their orbit in one direction accordingly rotating the output gear 408 and interruption of the movement of the other leg causing a movement in the opposite direction. The working legs of the differential drive are selectively arrested by means of a reversing clutch lever 111 fulcrumed on the frame at 112, and adapted for neutral, additive and subtractive setting. Clockwise movement of the clutch lever from neutral positions it to additive setting whereby a hook arm 114 of said lever will engage a lug upon gear 105 forming one leg of the differential drive and interrupting its rotation. Conversely, counterclockwise movement positions the lever 111 to subtractive setting whereby a hook arm 113 of said arm engages stop 110 for the other leg of the differential to interrupt its rotation and effect drive to the actuator 5 and tens carry members 17 in the reverse direction.

Locator cam 153 is fixed on shaft 350 which drives the gear train to the actuators. Upon rotation, the cam spreads the locator arms 422 thereby setting toggle 423 which will hold the arms out of contact with the locator cam during a registering operation.

Registration is effected in the multiplier quotient dials 85 by counting fingers 412, one of which is shown in Figure 3. These fingers are operated substantially as set forth in Patent No. 2,273,237 to Edward C. Walter. By adjustment of the change lever 69 (Fig. 16), registration may be effected either like or unlike in arithmetical sign the registrations of the actuators. The change lever is connected to a bell crank 413 by link 414 (Figs. 6 and 16). The bell crank through pin engagement with a circumferential slot in a collar fixed on shaft 415 is adapted to move said shaft transversely of the machine to move selectively one or the other of the two cams 416 and 417 (Fig. 3) fixed on the shaft 415 out of or into driving relationship with the fingers 412, the shaft 415 being driven through a spline by gear 406 at a 1 to 1 ratio with the actuators.

PLUS AND MINUS BAR OPERATION (REPEAT KEY SET)

With the repeat key 409 set (Figs. 1 and 6), registration is controlled by a plus bar 120 and a minus bar 121 (Figs. 1, 2, 15 and 16) as follows.

The bars have link connections 123 with a rock shaft 125 extending across the machine and provided with a setting plate 128 having spaced lugs 128' and adapted to engage an arm 130 of reversing clutch lever 111. Depression of the plus bar 120 will rock shaft 125 clockwise as viewed in Figures 2 and 16 setting the clutch lever 111 from neutral into adding position, and depression of the minus bar 121 will effect opposite rocking of shaft 125 setting the clutch lever into subtracting position. Lever 111, in moving into either of its active positions is adapted to close the contacts of a circuit breaker interposed in the motor circuit by means of an arm 200.

Figure 18:
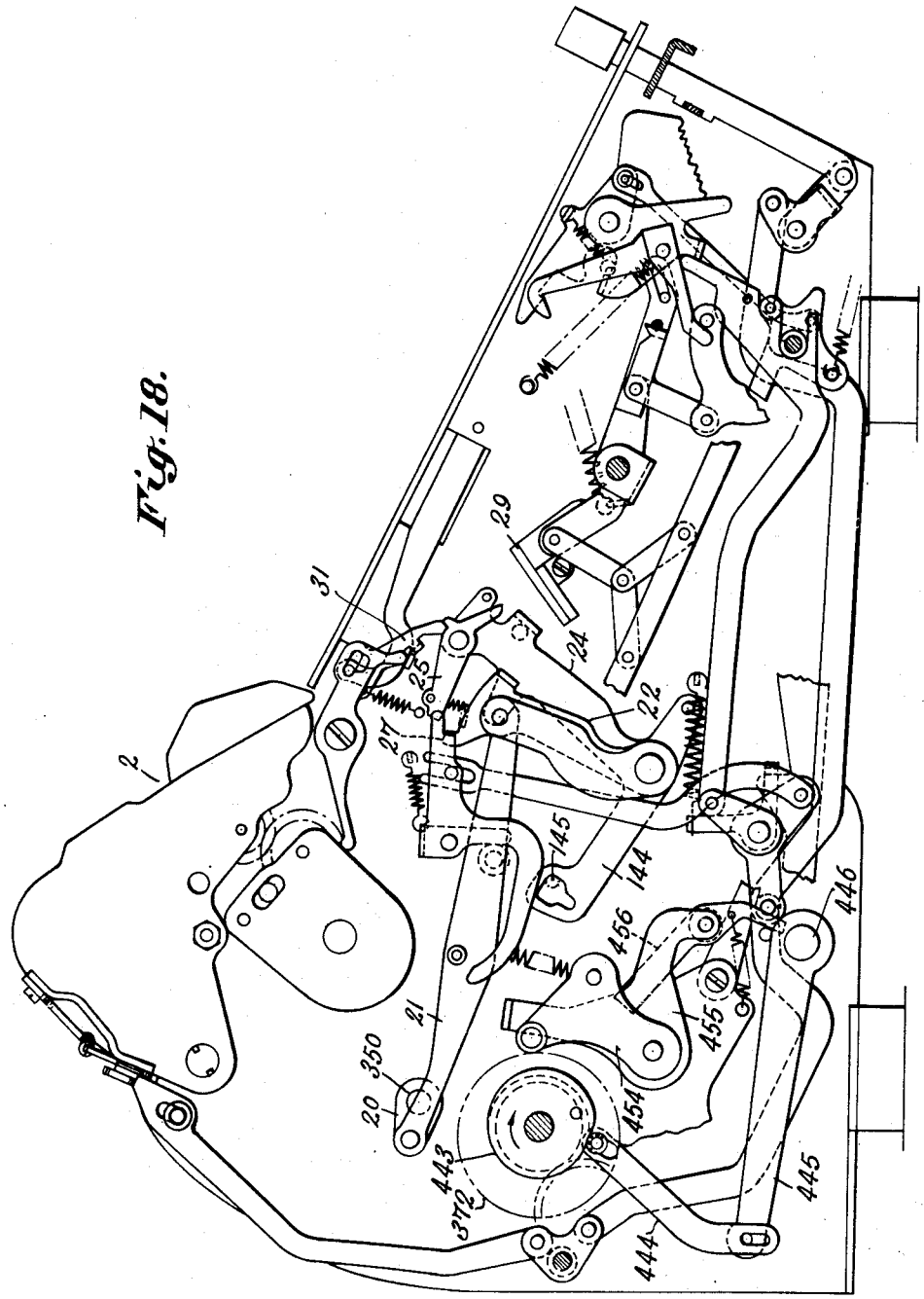
Fig. 18 is a left side elevation of the machine showing a portion of the means for raising the main carriage during a shift operation.

Upon manual release of the plus bar 120 or minus bar 121 the parts will be brought to rest in full cycle position as follows:

Setting plate 128 is provided with opposed cam faces operating on the depression of either bar (Fig. 15), through a roller 133 to depress the rear end of a lever 134. This movement of lever 134 carries a pawl 136, mounted upon said lever into position beneath a trigger 31 normally engaging a pawl 25 mounted on the stop arm 24, and serving to hold said pawl inactive (Fig. 18). Upon release of the key suitable springs will return lever 134 to normal position, causing the pawl 136 to raise trigger 31 and release pawl 25, the latter dropping into position behind a shoulder 27 of rock arm 22, connected to shaft 350 by crank 20 and link 21. Shaft 350 is driven by friction clutch 352 (Fig. 13) and drives the actuators at a 1 to 1 ratio therewith through gearing 407, 406, etc., as heretofore described. Engagement of pawl 25 with shoulder 27 connects the arms 22 and 24 to operate in unison, the latter being carried against a fixed stop 29 to prevent further rotation of the parts in the original direction as shown in Figure 15. Upon rebound of the parts from stop 29, a lug of pawl 25 will engage with the end of trigger 31 and lift said pawl out of engagement with shoulder 27.

In the movement of arm 24 against stop 29 a rearward extension 144 of said arm will engage a pin 145 of reversing clutch lever 111, and through the action of one or the other of the two opposed cam faces of said extension will move said lever to its neutral position.

Furthermore the movement of arm 24 against stop 29 through link 424 and arm 425 rocks shaft 426 extending across the machine counterclockwise (Fig. 19) and clockwise (Fig. 20) and through suitable linkage 427 rocks shaft 428 counterclockwise. Fixed on shaft 428 is arm 429, a hook end of which is raised upon rocking of the shaft to contact a pin connecting the two links comprising the toggle 423 and break said toggle. Upon breaking of the toggle, the locator arms 422 are pulled inward against the cam 153 by a suitable spring and when arm 24 rebounds from the stop 29, the parts are located in full cycle position as shown in Figure 6.

PLUS AND MINUS BAR OPERATION (NONREPEAT KEY SET)

Depression of nonrepeat key 410 rocks plate 411 clockwise unsetting the repeat key 409 and moving lever 418 by contact with a nose at the bottom of the lever into position to be operated by cam 419 (Figs. 6 and 8). Cam 419 is loosely mounted on a stud and driven by a pin on gear 420 mounted on the stud, said gear being driven at a one to one ratio through suitable gearing with the actuators. Lost motion is thus provided so that the cam 419 moves the lever 418 to the left near the end of a cycle of operation of the actuators in either direction. Lever 418 drives a tripping lever 421 through pin and slot connection causing the machine to be limited to one cycle of operation should the plus or minus bar be held depressed. The stopping of the machine by operation of lever 421 is effected as follows:

Lever 421 is adapted to be raised during certain machine operations hereinafter described. However, it is normally in the lower position (Figs. 6 and 9) and is adapted to contact a lug on an arm of bell crank 430. The other arm of the bell crank is seated in a recess in slide 431 extending across the machine and when moved to the left (Fig. 22) serves to move locking bails 432 to release depressed keys 18 and clear the keyboard.

The lug of bell crank 430 overlies an arm of another bell crank 433 so that the two cranks are moved as a unit when the tripping lever 421 is operated by cam 419. The active arm of the bell crank 433 contacts a slide 434 mounted on the underside of the keyboard and extending across the machine. Upon operation of the bell crank 433, the slide 434 is moved to the left (Fig. 22) and the left end thereof contacts an arm of bell crank 435 and rocks said crank counterclockwise against tension of a suitable spring. The free end of bell crank 435 through contact with a cam face, serves to depress a member 436 (Fig. 27 and 22) pivoted to the left hand side frame of the machine. The member 436 is provided with lugs 436' which connect it to the forward end of a lever 437 fulcrumed at 438. The forward end of the lever 437 is located inwardly of the left hand side frame (Fig. 22) and extends rearwardly through a suitable opening to the outside of the frame where it has pin and slot connecting with trigger 31.

Depression of member 436 accordingly lowers the forward end of lever 437 and raises the rearward end operating trigger 31 and releasing pawl 25 to engage shoulder 27 of rock arm 22. Following this operation the machine is brought to rest in full cycle position as heretofore described.

Figure 27:
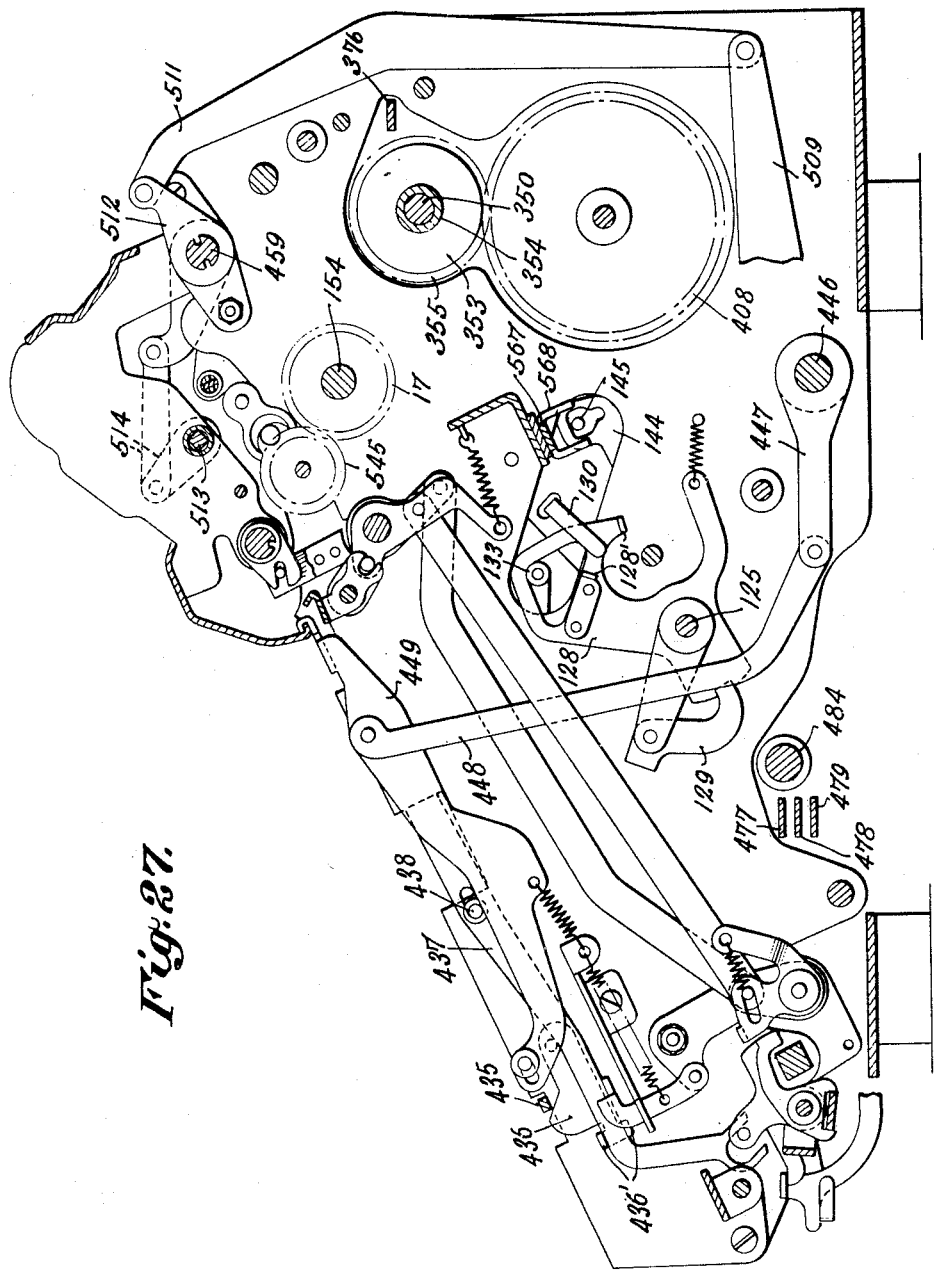
Fig. 27 is a vertical section taken just inside the left hand side frame of the machine and showing certain linkage for the clearout mechanism and means for raising and lowering the main carriage.

However, should the plus or minus bar be held depressed holding shaft 125 in rocked position, provision must be made to allow setting plate 128 to be returned to its central position. To this end, plate 128 is loosely mounted on shaft 125 and is rocked to one or the other of its active positions by a coupling device 129 mounted on an arm fixed on shaft 125 (Fig. 27). When arm 24 is carried to the fixed stop 29 by arm 22 through pawl 25, a pin on an extension of arm 24 contacts an arm of coupling device 129 releasing it from engagement with plate 128 (Fig. 15) allowing said plate to be returned to its central position.

CARRIAGE SHIFT MECHANISM

The carriage shift devices herein disclosed embody the operational features substantially as set forth in Patent No. 2,419,760 to E. F. Britten, Jr. However, means for lifting the carriage to partly unmesh the intermediate gears in the carriage and body of the machine for clearance prior to initiation of a shift, are included. Furthermore, tabulating keys are provided whereby a shift may be terminated in a predetermined position while one of the shift keys is held depressed. Part of this tabulating means also functions in the performance of certain calculations to terminate the shift when the carriage has been shifted to one or the other of its extreme positions.

Figure 13:
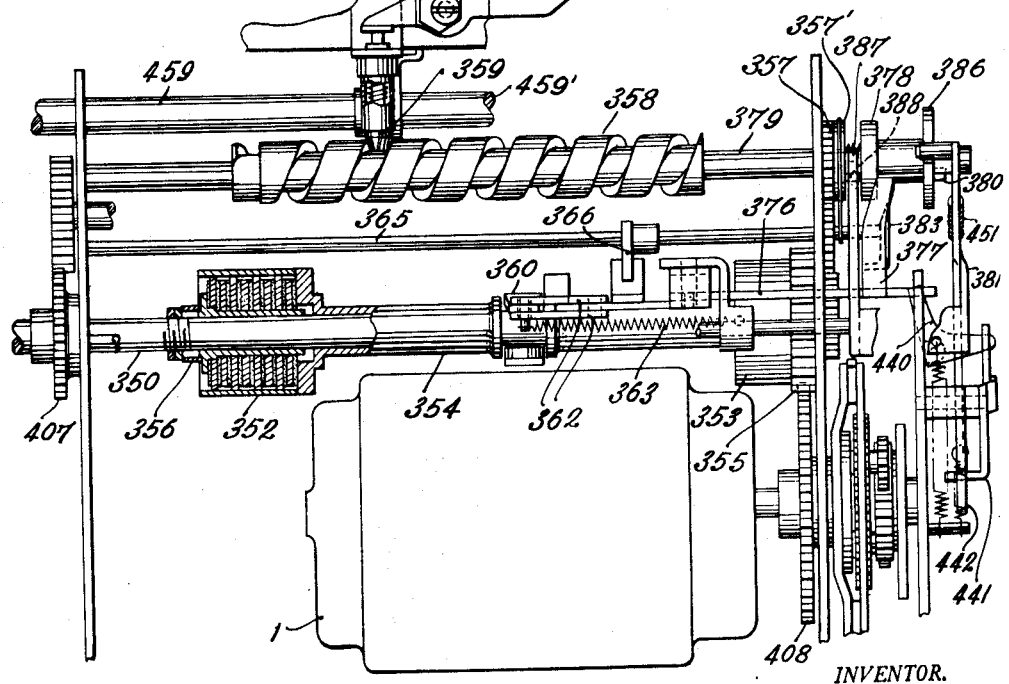
Fig. 13 is an elevation and partial section of portions of the carriage shift and actuator drive and control mechanism as viewed from the rear of the machine.

As herein disclosed and as set forth in the above mentioned patent, the means which control the extent and direction of actuator movement are utilized to control the extent and direction of shift of the carriage 2 (Fig. 1). For this purpose two friction clutches 352 and 353 are provided as shown in Figure 13, the driving elements of these clutches being connected for rotation as a unit by a sleeve 354. The driving elements of clutches 352 and 353 are connected to the output gear 408 of the differential gear drive by means of a gear 355 secured to the driving member of clutch 353. The driven member of clutch 352 consists of a sleeve 356, fast upon shaft 350, a series of friction disks being interposed between the driving member of the clutch and the driven member 356. Normally clutch 352, is held engaged under spring tension connecting the drive to the actuators to the output of the differential.

Clutch 353, which is normally disengaged, has a driven member similar to member 356 of clutch 352 except that it is freely supported on shaft 350 and is provided with gearing connection 357. The carriage is mounted at its ends and center on the aligned shafts 459 and 459' which are slidably and pivotally mounted in the framing of the machine. Worm 358 is engaged by a spring plunger 359 depending from carriage 2, the carriage thus being shifted to the right or to the left upon rotation of the worm 358 in one or the other direction.

Sleeve 354 is moved to the right or to the left, and is held under spring tension in either shifted position, to engage clutch 352 or clutch 353 by means of a toggle arrangement best shown in Figures 2 and 13 and fully disclosed in the aforementioned Patent No. 2,419,760. A shifting arm 360 is provided with anti-friction rollers engaging between flanges of sleeve 354, and is pivoted at one end to a link 361, having pivotal connection to the machine framing, and at the other end has connection with one link of a toggle 362, the far end of this toggle being also pivotally secured to a bracket rigidly mounted on a fixed shaft extending between the side frames of the machine.

Figure 14:
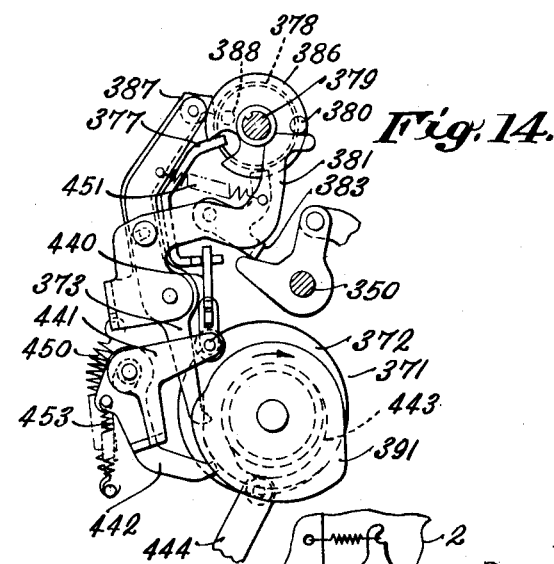
Fig. 14 is a detailed fragmentary left side elevation of portions of the carriage shift and actuator drive control mechanism.

In normal position of the parts toggle 362 is fully extended, holding arm 360 against the tension of spring 363 in position to engage clutch 352 in which position the clutch is yieldably held engaged under the tension of a spring 334 connected to link 361. In order to disengage clutch 352 and engage clutch 353, means are provided for breaking the toggle 362, thereby allowing a spring 363 to move sleeve 354 to the right as viewed in Figure 13, in which position clutch 353 will be held engaged under tension of spring 363. For breaking the toggle, a shaft 365 is adapted to be rocked clockwise (Fig. 2) and is provided with a finger 366 which will unset the toggle through contact with a lug 362' thereof. Shaft 365 is rocked by depression of the right shift key 369 or left shift key 370 as follows:

These keys 369 and 370 are mounted in the machine frame closely adjacent to the plus bar 120 and minus bar 121 (Figs. 1 and 16). Right shift key 369 has a shoulder overlying a stud 397 carried by the stem of plus bar 120, and left shift key 370 has a shoulder overlying a stud 398 in the stem of minus bar 121, both keys extending downward and having slot and pin connection with a lever 368 (Figs. 6, 17, 20 and 23). Pivotally mounted on the rear end of lever 368 and spring biased toward the front of the machine is arm 367 provided with a shoulder 367' (Figs. 23 and 24) and at the free end thereof a plunger 438 the function of which will be later described. Fixed on shaft 365 extending through the frame of the machine, is latch lever 439 the forward end of which is provided with a bent over portion normally overlying the shoulder 367' on latch arm 367 and a nose portion to the rear which acts as a stop by contact with shaft 426. Depression of the right shift key 369 will, therefore, effect depression of the plus bar 120, effecting additive drive from the differential to the driving members of friction clutches 352 and 353 and conversely negative drive from the differential will be effected by depression of the left shift key 370 which will effect depression of the minus bar 121. At the same time, depression of either of these shift keys will depress the forward end of lever 368 (Fig. 23) and raise its rearward end with the arm 367 attached thereto. This movement will rock lever 439 and shaft 365 clockwise by contact of shoulder 367' with the bent over portion of said lever, breaking the toggle 362 and engaging shift clutch 353 at which time clutch 352 is disengaged. Although drive to the shift worm 358 is thus effected, clutch 352 will slip momentarily and the worm 358 will be held locked against rotation while a one cycle clutch 371 (Figs. 19 and 26) makes a partial rotation comprising a relatively short step in the cycle to effect lifting of the carriage 2 to provide clearance during the shift as follows:

When toggle 362 is broken to initiate a shift, a link 376 connected to a crank extension of one of the toggle links will be moved to the right (Fig. 13). The end of the link has slot connection with the upper arm of a bell crank 440 the other arm of which, has link connection to one arm of another bell crank 441 (Figs. 19 and 26). Depending arm of crank 441 is provided with a slot which engages a detent 442 which is spring urged to normally engage a pawl of clutch 371 holding it disengaged. The clutch is driven through suitable gearing by the electric motor 1. Upon movement of slide 376, the bell crank 440 will therefore be rocked and accordingly the bell crank 441 will lift detent 442 against tension of spring 453 out of engagement with the pawl of clutch 371 to engage the drive. A second detent 373 normally rests against the perifery of the driven member of clutch 371 and has pin and slot connection with tripping arm 381. A spring 450 urges arm 381 counterclockwise and thus detent 373 in the same direction. An upwardly extending arm of the detent 373 is provided with a roller which normally engages a slot in the disk 386 secured to a sleeve which is splined to shaft 379 of the shifting worm 358. Thus the worm is held against rotation until the clutch 371 has rotated a distance which allows the detent 373 to engage the pawl of clutch 371 and interrupt the drive (Fig. 14). When the detent 373 moves inwardly to disengage the clutch 371, the upwardly extending arm of the detent disengages its roller from the slot in disk 386 permitting the engaged shift clutch 353 to drive the shifting worm 358.

The above described step in the cycle of rotation of clutch 371 effects lifting of the carriage 2 through a cam 443 (Figs. 14 and 26) secured to the driven member of the clutch (Figs. 14 and 26). A link 444 provided with a roller at its upper end in contact with the cam 443 and guided by a slot in the framing of the machine (not shown) is moved downwardly by rotation of said cam (Fig. 14). Link 444 is attached through pin and slot connection to the end of arm 445 (Fig. 26) fixed on a shaft 446 extending across the machine. Downward movement of link 444 will thus rock shaft 446 counterclockwise (Fig. 26) and clockwise (Fig. 27) against the tension of a spring attached to arm 458 fixed on said shaft (Fig. 6). Fixed on shaft 446 are a pair of arms 447 (one of which is shown in Fig. 27) having link connections 448 with a pair of carriage lifters 449. The carriage lifters are provided with slots at their forward ends by which they are pivotally mounted on pins on the inner sides of the right and left side frames of the machine respectively. The rearward ends of the lifters 449 are provided with hook end portions adapted to fit under and over an inwardly turned shelf located at the front and extending the length of the carriage 2.

Rocking of shaft 446 will, therefore, raise arms 447 and through the link connections raise the carriage lifters thereby lifting the carriage pivotally mounted at its rear to partly unmesh the intermediate gears in the carriage from those in the body of the machine. As will be readily understood, the carriage will be in sliding engagement with the lifters during the shift at which time they perform the function of supports and guides. Also, it will be seen that the lift cam 443 is arrested in its rotation (Fig. 14) in position to hold the carriage in raised position during the shift which will be continuous as long as a shift key is held depressed or until the carriage has been shifted into a position indicated by a set tabulating key 402 (Fig. 25) or to either of its extreme positions as will be hereinafter described.

Release of shift key 369 or 370 will bring about the termination of the shift whereupon the one cycle clutch 371 will complete its cycle for the purpose of normalizing the several parts. To this end, when toggle 362 is broken to initiate a shift adjustment of the mechanism takes place as follows:

When toggle 362 is broken link 376 (Fig. 13) is moved to the right, as heretofore described, carrying an arm 377 integral therewith out of restraining engagement with a disk 378, fixed upon a sleeve which is splined to the shaft 379 of the shifting worm 358. A disk 386 secured to the opposite ends of this sleeve is provided with a pin 380 (Figs. 14 and 26), normally lying to the left of a tripping arm 381, pivotally mounted on a common shaft with clutch detent 373. The detent 373 and tripping arm 381 have pin and slot connection and an upstanding arm of the detent and the tripping arms have attachment to the respective ends of a spring 451 which urges them one toward the other to the limit of the pin and slot connection. As heretofore described, the arm of the detent 373 has a roller which normally engages a slot in disk 386 and is removed therefrom when the detent acts to arrest the rotation of the clutch 371 following its engagement by lifting the detent 442 from engagement with the pawl of the clutch. A spring urges disk 378 and the associated parts toward the right (Fig. 13), but the disk is restrained after the removal of the restraint of arm 377 by engagement with a crank arm 383, more clearly shown in Figure 15. Crank arm 383 is secured upon shift initiating shaft 365 which is rocked upon depression of a shift key and thus rocks the arms 383 into path of movement of the disk 378. As movement of the disks 378 and 386 to the right act to terminate the shift, restraining crank arm 383 provides for continuous shifting until the carriage has reached its extreme position or until the shift key is released.

Upon release of the shift key, shift 365 will be restored by counterclockwise rotation of lever 439 (Fig. 6), under the influence of spring 452, thereby removing crank 383 from the path of disk 378. Spring urged disk 378 will now move to the right as viewed in Figure 13, and with its disk 386 and pin 380 until blocked by contact with tripping arm 381. As shaft 379 of worm 358 completes its cycle of operation, pin 380 will contact one of the two opposed cam faces of tripping arm 381 (Fig. 14) rocking said arm clockwise against the tension of spring 450 and putting detent 373 under tension of spring 451 thereby biasing the roller of the arm of said detent against the perifery of disk 386. This relative movement between the tripping arm 381 and detent 373 is allowed by the pin and slot connection therebetween. As this movement reaches its maximum, the shift worm reaches its full cycle position at which time the slot in disk 386 is in registration with the roller on the arm of detent 373 and said roller is urged to enter the slot by tensioned spring 451. In order to insure this action and prevent the worm from running past full cycle position, tripping arms 381 is provided with an extension 387 (Figs. 13 and 14). When the tripping arm is moved by pin 380, the extension 387 is moved into the path of a pin 388, which is fixed in a disk 357' rotating with gear 357 which is fast on shaft 379, thereby preventing movement of the shaft beyond full cycle position. As the shaft may be rotating in either direction, pin 388 may engage extension 387 on either side thereof, for which reason the disk 357' to which pin 388 is fixed has pin and slot lost motion driving connection with gear 357. When the roller on the arm of detent 373 enters the slot in disk 386, said detent is removed from engagement with the pawl of clutch 371 permitting the reengagement of the clutch to complete its cycle of operation to normalize the several parts. In this connection, it will be noted that the toggle 362 must be reset to disengage the friction clutch 353 and engage clutch 352 and that the clutch lever 111 (Fig. 15) must be disengaged. Also the carriage must be lowered to its normal position. Furthermore, it will be observed that, although the plus or minus bar is depressed and released with the shift key arm 22 will not rock during a shifting operation, and therefore the tripping of the trigger 31, as the plus or minus bar is released, will be ineffective. Disengagement of clutch lever 111 lowering of the carriage and resetting of toggle 362 is accomplished by the clutch 371 as follows:

The clutch 371 is provided with cams 372 and 391 secured to the driven member of said clutch. Upon rotation of clutch 371 in its second step of movement, cam 391 (Fig. 14) will engage a roller on an arm of bell crank 441 rocking the crank counterclockwise, thereby through the link connection rocking bell crank 440 counterclockwise (Fig. 13) to move the slide 376 to the left and reset the toggle 362. Also detent 442 will now be urged inwardly by spring 453. When slide 376 is moved to the left, disk 386 and pin 380 are removed from engagement with tripping arm 381 allowing the arm to be rocked counterclockwise by spring 450 urging detent 373 through the pin and slot connection against the periphery of the driven member of the clutch 371. In this connection, it will be noted, that the roller on the arm of the detent 373 will be moved outward from the bottom of the slot in disk 386 but not removed, thus holding the shift worm 358 in locked full cycle position (Fig. 26). During this second step of rotation of the clutch 371, the clutch lever 111 will be restored to its neutral position by operation of cam 372. To this end, arm 454 (Figs. 19 and 26), pivotally mounted to the frame of the machine, is provided with a roller held in contact with cam 372 by action of a spring attached to said arm. A second arm 455 having common pivotal mounting with arm 454 is provided with a latch 456 the upstanding end of which is normally in the path of movement of a pin in arm 454 so that arm 455 will be rocked in unison with arm 454. Arm 455 will, therefore, be rocked clockwise (Figs. 19 and 26) upon rotation of clutch 371 in its second step of movement. An upstanding extension of arm 455 will thus contact a lug on link 424 attached to the full cycle arm 24 at its forward end, and move the link toward the front of the machine thus rocking arm 24 clockwise about its pivot, raising the cam extension 144 (Fig. 15) into contact with the pin 145 of clutch lever 111 and thereby centralizing the clutch lever. At this point, it will be noted that the circuit breaker to the motor has been broken, and although clutch 371 has not yet reached its full cycle position, cams 372 and 391 have completed their work and the clutch through momentum will be free to coast to the completion of its cycle where the drive will be disengaged by detent 442. Also, clutch 353 is still in engagement when the shift worm 358 is stopped and therefore a momentary slippage of the clutch will take place as toggle 362 is being reset. Furthermore, as the clutch 371 completes its cycle of operation it will be seen that the cam 443 will allow the carriage 2 to be lowered to its normal position under the urge of spring 457 (Fig. 6).

CARRIAGE SHIFT (LAST PLACE STOP AND TABULATING KEYS)

Should the right shift key 369 or left shift key 370 be held depressed until the carriage is shifted into either of its extreme positions, shift initiating shaft 365 will be restored to normal whereby the drive is terminated in the same manner as described when the shaft 365 is restored to normal by release of the shift key. For this purpose, two lugs 460 (Figs. 20, 23, 24 and 25) are located on the rear of the carriage and so spaced that the nose of a plunger 438 mounted on arm 367 is positioned just below one or the other of the lugs when the carriage is in either of its extreme shifted positions. Should the carriage be in the extreme right hand position for example and the left shift key be depressed (Fig. 23), the plunger which is spring urged to its normal position (Fig. 20) will be depressed by contact with the lug 460 when arm 367 is raised and the shift initiated. When the carriage has shifted from the extreme right hand position, the lug 460 will be removed from contact with the plunger 438 and said plunger will be spring urged to its extended position. As the carriage is shifted into the extreme left hand position, the nose of the plunger will ride outward on the inclined edge 460' of the lug 460 thus moving arm 367 to the rear against the tension of its spring (Fig. 24). This movement of arm 367 will remove shoulder 367' from restraining engagement with latch lever 439 allowing the lever and shaft 365 to be spring urged counterclockwise to normal and thus terminate the shift. When the shift key is finally released, the plunger 438 will drop below lug 460 and arm 367 will be urged forward by its spring locating the shoulder 367' in its normal position below the forward end of latch lever 439 (Fig. 20). Termination of the shift at the extreme position in the opposite direction is, as will be readily understood, accomplished in the same manner. Should a shift key be depressed while the carriage is in the extreme position of the indicated shift, a shift will be initiated but as the plunger 359 is at the end of the worm 358 the drive will be ineffective to move the carriage. However, the plunger 359 which is spring urged within the groove of the worm 358 will be raised to ride over the outer diameter of the worm by the eccentric conformation of the worm at either end, as will be seen in Figures 2, 13 and 22. This action is utilized for a purpose hereinafter described.

The tabulating keys 402, one for each order intermediate the extreme right and left hand carriage shift positions, are located on the rear of the carriage intermediate the lugs 460 (Fig. 25). The lower end 461 of each key 402 is bent outwardly from the carriage at substantially the same angle as the lugs 460, and are provided with a pair of oppositely disposed inclined edges which are adapted to displace plunger 438 in the same manner as described in connection with the inclined edges 460' of the lugs 460. In the unset position of the keys 402, the ends 461 are raised above and out of range of the plunger 438 when a shift key is depressed. However, when one of the keys 402 is depressed, its end 461 is brought into the same plane as the lugs 460 and should the carriage be shifted either to the right or left into the order indicated by the said key, one or the other of the inclined edges of the end portion 461 will act to displace the plunger 438 and terminate the shift in the same manner as described in connection with the lugs 460. As will be noted in Figure 25, a depressed key 402 is latched in set position by a lug 462' one of which is provided for each key, on slide 462 which is spring urged to the left. Upon depression of one or the other keys 402 and before it is latched, an inclined edge of the key stem will, by contact with its lug cam the locking slide 462 to the right allowing the previously set key to be restored by a suitable spring to normal. An additional key 463 is provided which functions in like manner to unset anyone of the keys 402 thereby providing for shift to the extreme in either direction.

UPPER DIAL, LOWER DIAL AND KEYBOARD CLEAROUT MECHANISM

Figure 29:
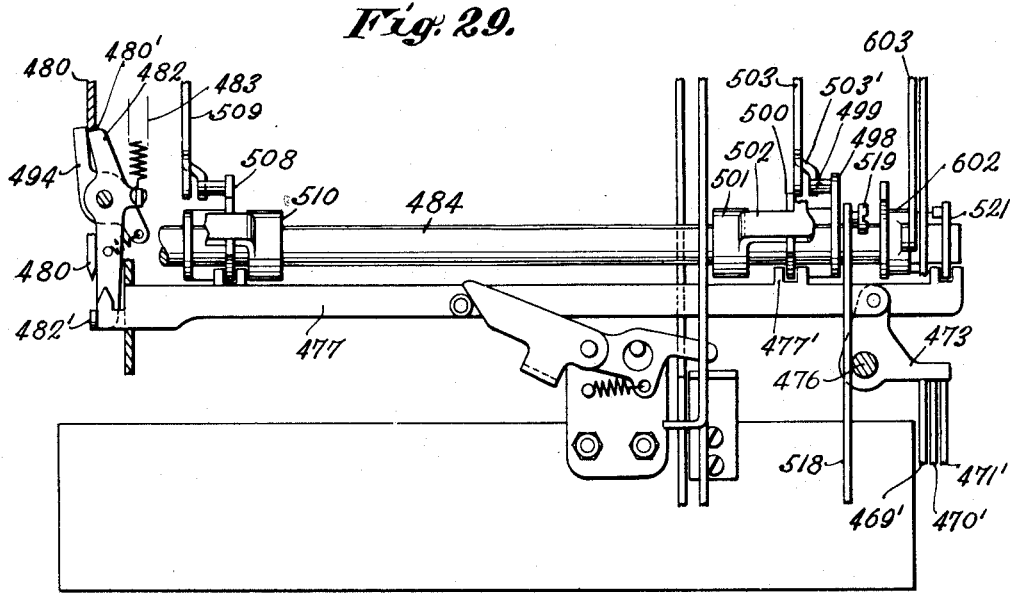
Fig. 29 is a fragmentary plan view of certain portions of the clearout mechanism.
Figure 30:
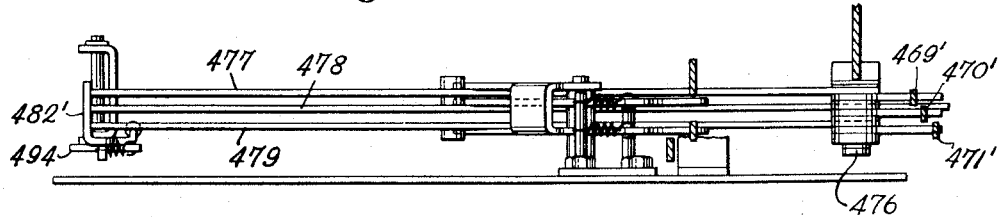
Fig. 30 is a front elevation of the parts shown in Fig. 29.
Figure 31:
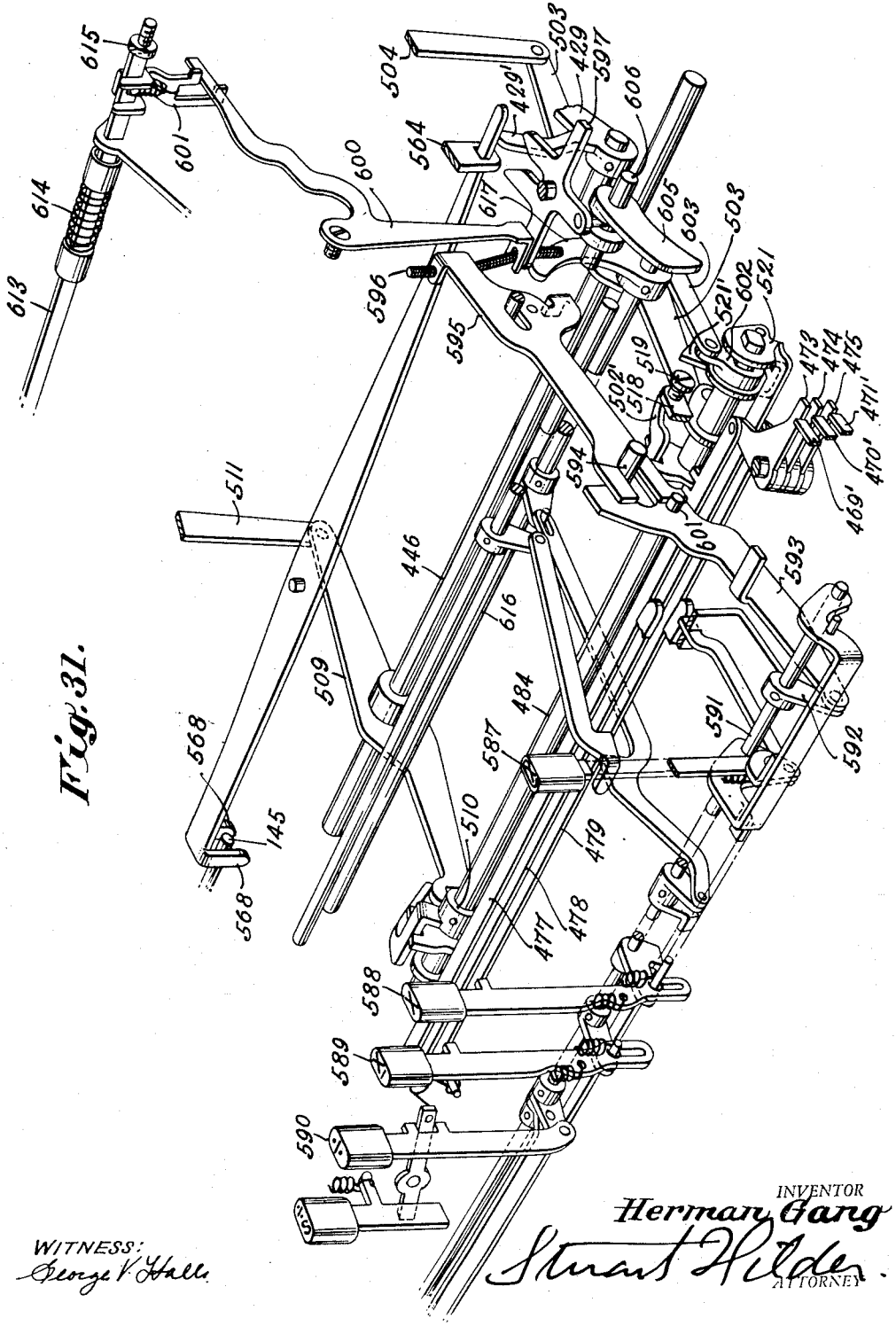
Fig. 31 is a perspective view with several of the parts in exploded relationship of portions of the setting and control mechanisms.

The machine is provided with a one cycle clutch 464 (Figs. 19 and 26) which is selectively operated to return to zero the upper dials 85 comprising the multiplier quotient register, the lower dials 13 comprising the dividend product register, or to restore keys 18 which may be set on the keyboard 10. An upper dial clear key 465, a lower dial clear key 467 and a keyboard clear key 466 are grouped on the lower right hand side of the keyboard 10 (Fig. 1). A fourth key 468 completes the key grouping and is adapted for simultaneous depression with the keys 465 and 467 to initiate certain machine operations hereinafter described. The depression of any one of the keys 465, 466, or 467 serves to engage the clutch 464 and to select the operation it will perform. The keys, however, are adapted to be depressed simultaneously, whereby the clutch 464 will operate a single cycle to simultaneously clear the indicated dials and/or keyboard as follows:

Each of the stems of the clear keys 465, 466 and 467 is attached at its lower end to the forward ends respectively of levers 469, 470 and 471 which are pivotally mounted, one behind the other, at their rear on a stud 472 fixed on the right hand side frame. Lever 471 is shown in its entirety in Figure 16 and levers 469 and 470 are of like configuration. The levers 469, 470 and 471 are provided with depending arms which terminate in horizontally disposed fingers 469', 470' and 471' respectively, which are adapted for contact each with an arm of bell cranks 473, 474 and 475 respectively. The bell cranks are pivotally mounted on a vertical shaft 476 (Figs. 29 and 30), suitably fixed and depending from a cut out section of the right hand side frame. The bell cranks 473, 474 and 475 are connected to slides 477, 478 and 479 respectively which extend across the machine (Figs. 29, 30 and 31). Thus depression of anyone of the clear keys 465, 466 or 467 will rock its associated lever counterclockwise (Fig. 16) about the stud 472 and the finger 469', 470' or 471' will rock bell crank 473, 474 or 475 counterclockwise thus moving slide 477, 478 or 479 to the left. The movement of any one of the slides to the left either singly or simultaneously with either one or both of the other slides releases a double latch 482 (Figure 29) which allows the clearout clutch 464 to be engaged and selects the operation or operations to be powered by the clearout clutch. The double latch 482 which is normally in engagement with a shoulder 480' of a slide 480 (Figs. 19 and 29), holds said slide in its rearward position against the tension of a spring 481. The slide 480 is slidably supported at its forward end on a shaft 484 which extends across the machine and projects externally of the left hand side frame and is attached at its rearward end to an arm 485 fixed on shaft 486 which is rotatably mounted in the side frame. The leftward ends of slides 477, 478 and 479 are in abutment with an upstanding ear 482' of latch 482 (Figs. 29 and 30). Thus movement of one or more of the slides to the left will rock latch 482 clockwise about its pivot against tension of spring 483, releasing slide 480 which will be pulled forward by its spring 481. The left hand ends of the slides 477, 478 and 479 are each provided with a recess and when a slide is moved to its active position, the forward end of released slide 480 will enter such recess and hold the slides 477, 478 or 479 in set position until the engaging end of slide 480 has been removed when said slide is restored to latched position. Clearout clutch 464 (Fig. 19) is driven by a suitable gear train from the electric motor and is of well-known construction in which a spring pawl mounted on the driven member of the clutch is held out of engagement with the driving member by a detent. For this purpose a detent 487 (Figs. 19 and 26) is fixed on shaft 486 and when the slide 480 is released and pulled forward by its spring, the shaft 486 through arm 485 will be rocked counterclockwise thus removing detent 487 from engagement with the pawl of clutch 464 whereby engaging the drive to the motor (Figs. 19 and 26). Upon engagement of the clearout clutch the circuit breaker for the electric motor must be closed. For this purpose, a lever 490 (Fig. 15), pivotally mounted to the frame is urged counterclockwise by a suitable spring. A horizontally disposed arm of the lever 490 is in contact with a pin on the arm 200 (Figs. 15 and 26) and the lever is restrained from rotation by a lug 491 on the slide 480 in blocking contact with a depending arm of the lever 490. When the slide 480 is released to move forward, the lever 490 is urged counterclockwise by its spring and the forward end of lever 200 is lifted to close the circuit breaker.

So that the clutch 464 will make one cycle of operation and then be disengaged, provision is made to return the detent 487 into position to engage the pawl of the clutch before the clutch has completed its cycle. To this end, the detent 487 is provided with an extension 492 (Figs. 19 and 26), the free end of which is provided with a cam face 492'. When the detent 487 is disengaged (Fig. 19), the free end of the arm 492 is moved downwardly, thus bringing the cam face 492' into position to be engaged by a pin 493 mounted on the driven member of the clutch 464. As the clutch 464 approaches its full cycle position, the pin 493 will contact cam face 492' raising arm 492 and thus moving detent 487 into position where it will engage the pawl of the clutch 464 and disconnect the drive when the clutch reaches full cycle position. As the detent 487 is fast on shaft 486, the shaft will be rocked clockwise carrying arm 485 with it and moving slide 480 to the rear. The pin 493 of clutch 464 will pass under the cam face 492' providing sufficient movement to bring the shoulder 480' of the slide 480 to the rear of the restraining arm of latch 482 (Fig. 29) which will be urged into latching position by spring 482. The slide 480 will then be urged forward by its spring into contact with the latch 482 and the arm 492 moved slightly downward (Figs. 26 and 29). The latch 482 operates as above described only if the clearout keys 465, 466 and 467 have been released before the completion of the clearout cycle. If the clearout keys have been released, the ear 482' abutting the ends of the setting slides 477, 478 and 479 will move said slides to the right to their unset position. However, should a clear key be held depressed a setting slide will be held to the left and by contact with ear 482' hold the latch in rocked clockwise position out of the path of the shoulder 480' of slide 480 (Fig. 29). In this instance, a latch lever 494 having common pivotal mounting with latch 482 will be urged clockwise by spring connection with latch 482, thus positioning it in the path of the shoulder of slide 480 preventing forward movement of the slide. When the clearout keys are released, the latch 482 will then be free to be moved counterclockwise by spring 483 and return the slides 477, 478 or 479 to normal. As latch 482 is moved counterclockwise, it will by contact with latch 494, move said latch out of latching engagement with slide 480 and itself be moved into latching position thereby restraining said slide from forward movement (Fig. 29).

The clutch 464, during the foregoing cycle of operation, provides the power to operate the mechanism adjusted to active position by one or more of the setting slides 477, 478 and 479. To this end, the driven member of the clutch 464 is provided with an eccentric cam 495 (Fig. 26). The eccentric cam is adapted to impart a reciprocatory movement to a link 496 which is attached at its forward end to a crank arm 497 which is fixed on the shaft 484 which extends across the machine (Figs. 29 and 31). Thus when clutch 464 is operated, the shaft 484 is rocked clockwise (Fig. 26), counterclockwise (Fig. 31) during the first half of the cycle and during the second half of the cycle is rocked back to normal.

Figure 22:
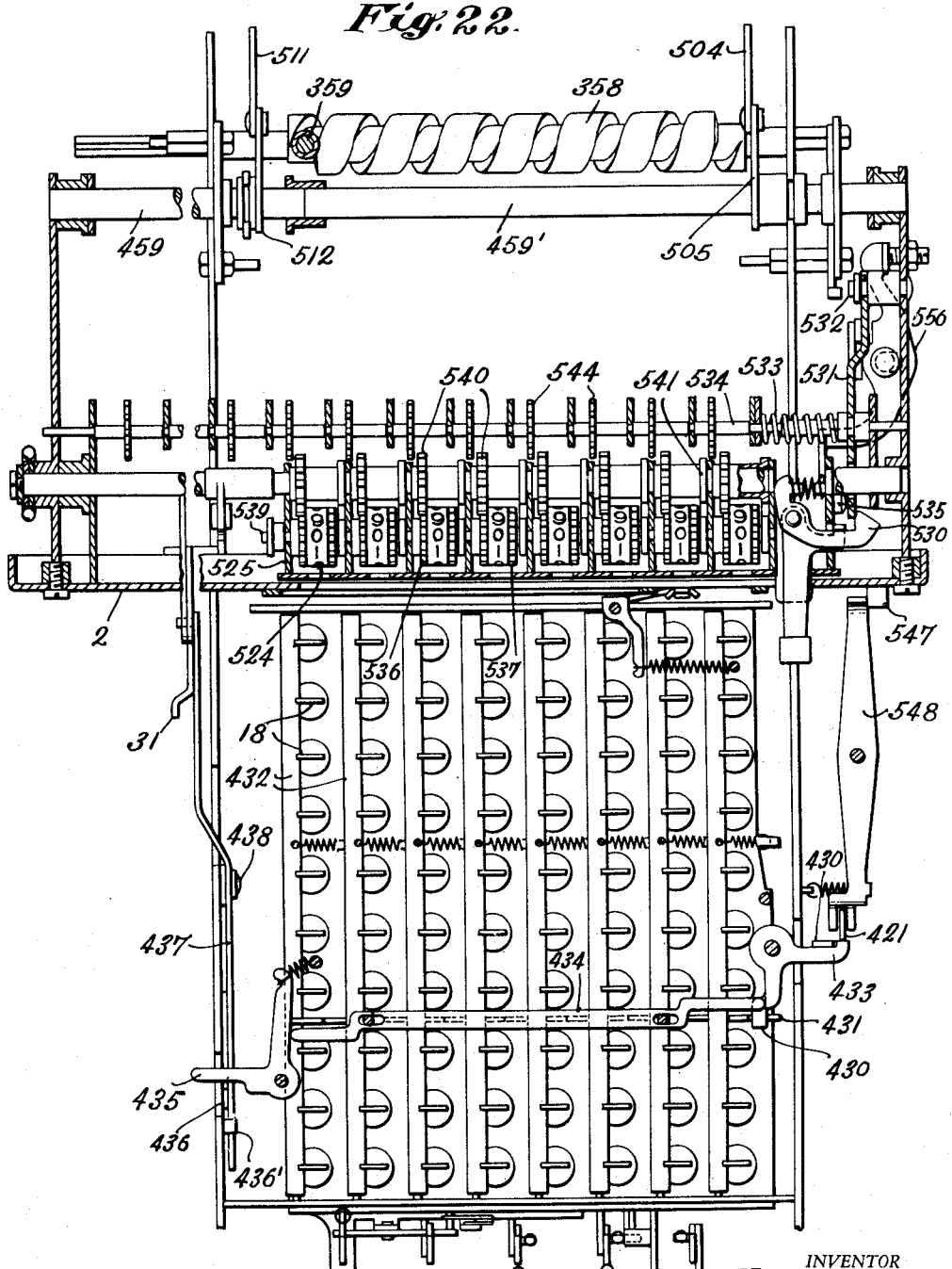
Fig. 22 is a partial section taken substantially on line 22—22 of Fig. 8 showing the subcarriage in latched position in the main carriage and the keyboard with the cover plate and key buttons removed.

Slidably mounted on shaft 484 and positioned to the left of the right hand side frame, is a rearwardly extending arm 498 (Figs. 2, 29 and 31) having a pin 499 extending to the left thereof. Integral with arm 498 and positioned to the left in spaced relationship thereto is a member 500 provided with an upstanding portion having an open end slot. Further to the left and fixed on shaft 484, is a collar 501 provided with an arm 502 extending to the right thereof and seated in the open end slot of member 500. Pivotally mounted on shaft 446 is a lever 503 (similar to lever 509, Figure 2), the forward end of which is provided with an opened end slot the bottom of which is defined by an ear 503' which is offset to the right (Fig. 29). Normally the forward end of lever 503 is held downwardly by a rearwardly extending finger 502' (Fig. 31) of the extension 502 (Fig. 29) of collar 501, the pin of lever 498 being positioned just above and out of contact with the ear 503'. However depression of clearout key 465 which will initiate the operation which will restore the upper dials 85 to zero; will, as heretofore described, move setting slide 477 to the left. Slide 477 (Fig. 29) is provided with a projection 477' (Figs. 29 and 31) having an opened end slot which engages the rim of member 500. Thus member 500 and arm 498 are moved to the left and the pin thereof into driving engagement with lever 503 through the slot in the forward end thereof. When shaft 484 is rocked by clearout clutch 464, arm 498 will therefore be rocked through arm 502 of collar 501 thus raising the forward end of the lever 503. The rearward end of lever 503 is connected to the bottom of a link 504 (Figs. 2 and 31) which is attached at its upper end to an arm 505 (Fig. 2) splined on the carriage shaft 459' and provided with a suitable bearing in the right hand side frame of the machine (Fig. 22). Thus as the rearward end of lever 503 is lowered, shaft 459' will be rocked clockwise and through suitable linkage 506, shaft 507 mounted in the carriage will likewise be rocked clockwise. The rocking of shaft 507 will serve to return to zero the wheels 85 (Fig. 3) in the manner fully disclosed in Patent No. 1,781,320 to L. P. Crosman. As shaft 484 is rocked clockwise back to normal, the pin of arm 498 by contact with ear 503' will move the forward end of lever 503 downwardly and at the end of the movement the finger 502' will further depress said lever lowering ear 503' slightly below the pin of arm 498 at which time slide 477 will be restored to its normal position if key 465 has been released. However, if key 465 is held depressed, the restoration of the slide will take place upon release of said key. Should one or the other of the setting slides 478 or 479 be moved to the left to initiate a cycle of clearout clutch 464 while slide 477 is in its normal position, the rocking movement of arm 498 will be ineffective to clear the wheels 85 as the pin of said arm is out of engagement with the slot on the forward end of lever 503.

The parts adjusted to active position by depression of key 467 and leftward movement of slide 479 for clearing the lower dials 13 to zero are of similar construction as that for the upper dials. An arm 508 (Figs. 2, 29 and 31) provided with a pin, is moved into driving engagement with a lever 509, the lever being driven by an arm of a collar 510 which is fixed on shaft 484. The rearward end of lever 509 is attached to a link 511 (Figs. 2 and 27) which is attached to an arm 512 (Fig. 27) splined on the carriage shaft 459 and provided with a suitable bearing in the left hand side frame of the machine. Hence, when shaft 459 is rocked clockwise, shaft 513 will, through suitable linkage 514 likewise be rocked clockwise and the wheels 13 (Fig. 3) will be zeroized in accordance with the above mentioned Patent No. 1,781,320.

As it is necessary that the intermediate gears in the carriage be out of mesh with the intermediate gears in the machine body (Fig. 3) when wheels 13 are cleared, a clearout cycle of clutch 464 operates to raise the forward end of the carriage. A cam 522 (Fig. 26) rotated with the driven member of clutch 464 serves to depress an arm 523 at the beginning of a clearout cycle. Arm 523 is fast on shaft 446 and as said shaft is rocked counterclockwise, the carriage 2 is lifted through arms 447, links 448 and lifters 449 (Fig. 27) in the same manner as previously described in connection with carriage shifting.

As clutch 464 approaches its full cycle position, arm 523 is allowed to move upwardly as spring 457 (Fig. 6) pulls the carriage downwardly into its normal position.

The depression of the clearout key 466 will initiate the operation to clear the keyboard 10 of values which may be set up by depressed keys 18 as follows:

The keyboard construction is of the well-known type in which a set key 18 in any order is latched in depressed position by a bail 432 (Fig. 22), and in which the depression of another key in that order will move the bail to release the set key, the key which is now depressed being in turn latched in set position by said bail. Accordingly, provision is made to simultaneously depress the row of keys 18 extending across the front of the keybord, one being provided for each other. Depression of these keys 18, which designates a zero value, serves only to move the bails 432, thereby releasing the set keys in each order thus allowing the setting slides 19 (Fig. 2) to return to normal and thus remove the values which may be set up on the actuators 5. The stem of each of the zero keys 18 terminates at its lower end in a horizontally disposed portion (Fig. 2). Extending across the machine is a bail 515 pivotally mounted on a shaft 516. The rearward edge of bail 515 overlies the horizontal ends of the zero keys 18 and is in contact therewith when the keys are in released position. Thus, it will be seen that when bail 515 is rocked clockwise the zero keys 18 will be depressed thereby releasing the value keys 18 which may be set in each order. The zero keys 18 will then be held in latched position by the bails 432 (Fig. 22). The bail 515 is provided at its right hand end with a depending arm 517 (Figs. 16 and 20) adjacent the inner wall of the right hand side frame. A push link 518 is attached to the arm 517 and extends rearwardly and in sliding contact with the inner wall of the right hand side frame. Mounted on the rear end of link 518 is a stud 519 extending through a horizontally disposed slot in the side frame and provided with an enlarged head which prevents lateral displacement of the link 518. The stud 519 is normally urged against the rear end of the slot in the side frame by a spring 520 (Fig. 16) through link 518 which is attached to the lower end of arm 517 and bail 515, thus maintaining said bail in its normal unrocked position. The shaft 484 extends through the right hand side frame externally thereof and is provided with an end portion, the sides of which are flattened to provide rotary drive to a member 521 (Figs. 16 and 31) slidably mounted thereon. Member 521 is provided with an upstanding lug 521' normally positioned to the right and rear of the head of stud 519. Clearout slide 478 extends to the right beyond the side frame and terminates in a rearward projection provided with a slot which engages a rim of member 521. Therefore, when the clearout key 466 is depressed and slide 478 moved to the left, the lug 521' of the member 521 will be brought into the plane of the head of bolt 519. As the shaft 484 is rocked counterclockwise by action of clearout clutch 464, member 521 is also rocked and lug 521 will contact the head of bolt 519 moving it forward in the slot in the side frame. Thus bail 515 is rocked to clear the keyboard through arm 517 and push link 518 on the rear end of which the bolt 519 is mounted.

MULTIPLIER DIVIDEND SETUP MECHANISM (2 CYCLE)

Figure 28:
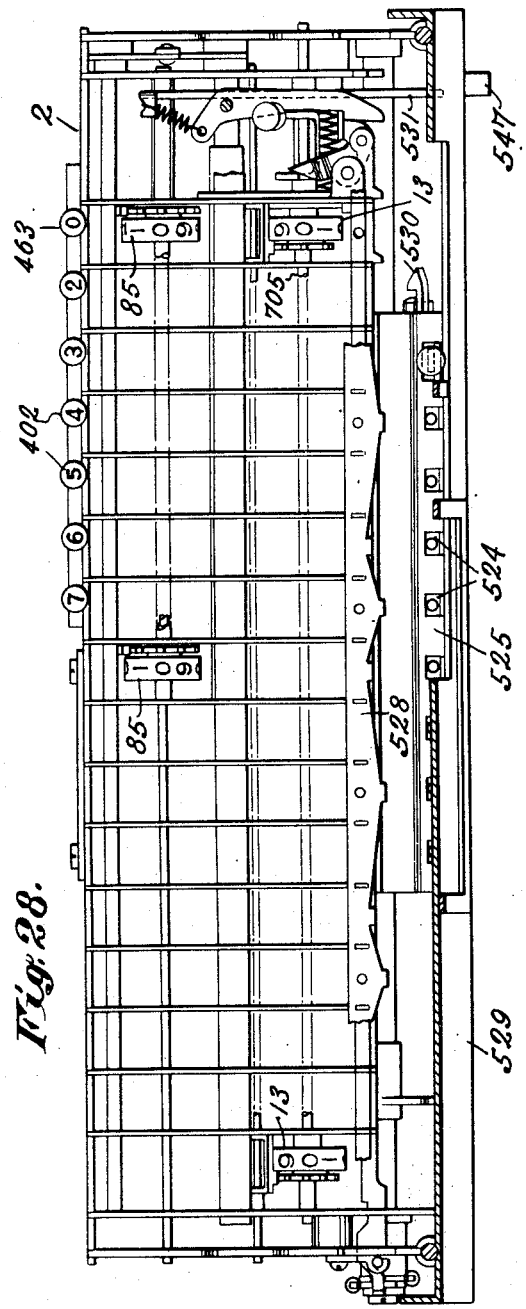
Fig. 28 is a plan view partially in section of the main carriage and showing the subcarriage in an adjusted position.

The two cycle setup mechanism constituting one form of the invention operates to setup a value set on the keys 18 of the keyboard 10 alternatively in the multiplier storage wheels 524 and storage gears 540 of a subcarriage 525 (Figs. 3, 22 and 28) or in the dividend product wheels 13 of the main carriage 2, the position of the carriage 2 determining whether the setup operation will be effective to setup a multiplier or a dividend. When the carriage 2 is in the extreme left hand position, the operation will effect a multiplier setup and when the carriage is in any position to the right thereof the operation will effect a dividend setup.

When subcarriage 525 is held in its normal position relative to the main carriage 2, one or another of the storage gears 540 will lie in the path of movement of a counting finger 626 (Fig. 3), mounted in the main frame of the machine and serving to control a product registering operation by counting the storage wheels 524 back to a registration of zero, according to a well-known type of multiplier control. One instance of such a multiplier control mechanism is disclosed in applicant's co-pending patent application, Serial No. 8,548, filed of even date herewith. However, in operations other than the registration of a product, counting fingers 626 will be reciprocated idly by the cams 628, below and out of contact with the gears 540.

Upon depression of a setup key 526 (Figs. 1, 6 and 8), a + cycle of operation of the machine is initiated, immediately followed by a — cycle. If the carriage 2 is in the extreme left hand position, the + cycle will cause the values set on keys 18 to be registered on the wheels 13 of the product dividend register and the — cycle which follows will remove the values set in the wheels 13 and simultaneously cause those values to be transferred to the multiplier storage wheels 524 and gears 540. As the — cycle is terminated the keys 18 are released, so that a multiplicand may then be set on these keys 18. However, the keys 18 will only be released if the operator releases the setup key 526 before the completion of the — cycle which is the usual operation. Should it be desired to square a number, the setup key 526 is held depressed until the setup cycles of the machine are completed, in which event the keys 18 will remain set and the same value retained on the keyboard 10 as has been set up on the storage wheels 524. The + cycle will cause a registration in the multiplier quotient wheels 85 which will, however be removed upon the following — cycle of operation. Should the carriage 2 be in any position to the right of the extreme left hand position, upon depression of the setup key 526, the + cycle will cause values set on keys 18 of keyboard 10 to be registered on the wheels 13 of the product dividend register. However, as this + cycle of operation is completed, the keys 18 are released rendering the following — cycle ineffective to remove the registration from the wheels 13. Thus the operation provides for a dividend setup. The — cycle is effective to remove the count effected by the + operation from the upper dials 85, thus clearing these dials for correct quotient registration.

MULTIPLIER DIVIDEND SETUP MECHANISM (2 CYCLE)

(Detailed description)

The subcarriage 525 (Figs. 3, 4, 8, 10, 22 and 28) is slidably mounted on a splined shaft 527 located in the front of the main carriage 2. The shaft 527 extends the length of the carriage 2 and is adapted for rocking movement and is provided with suitable bearings in the end plates of said carriage. The subcarriage is further supported by an upstanding strip attached to and extending the length of said subcarriage, the upper edge of said strip being positioned between depending lugs (Figs. 8 and 28) of a guide plate 528 attached to the underside of a cover plate 529 mounted on the carriage 2. The subcarriage 525 is thus adapted for longitudinal movement relative to the main carriage 2. The subcarriage is provided with a latch 530 which normally couples it in its extreme right hand position to the forward end of plate 531 of the main carriage (Figs. 8 and 22). The latch 530 provides that the subcarriage 525 may be disengaged from plate 531 and manually shifted to the left in the performance of certain machine operations hereinafter described. The plate 531 is spaced inwardly from the right hand end plate of the carriage 2 and is pivotally mounted at its rear on a stud 532 mounted on and extending inwardly of said end plate. It will be noted that the stud 532 (Figs. 8 and 22) is of somewhat smaller diameter than the mounting hole in the rear of plate 531 and that the retaining washer on the stud is positioned a slight distance inwardly of the plate. Thus it will be seen that the forward end of plate 531 may be displaced a slight distance longitudinally of the main carriage 2 with the stud 532 acting as a pivot at the rear of the plate. A compression spring 533, mounted on a shaft 534 extending the length of the main carriage 2, has its inward end in abutment with a partition plate of the carriage and normally urges the plate 531 to the right (Fig. 22) against a collar which is in abutment with another partition plate of carriage 2. A stud 535 projecting from the right hand end of subcarriage 525 is in abutment with the inner surface of the forward end of plate 531. Thus it will be seen that when the forward end of plate 531 is moved longitudinally to the left of the main carriage 2, as will be hereinafter described, the subcarriage 525 will likewise be moved by contact of said plate with the stud 535 in the end of the subcarriage. Furthermore, it will be seen, that when the plate 531 is moved to the right back to normal by spring 533, the subcarriage will also be likewise moved because of its connection with the plate by latch 530. However, when main carriage 2 is in the extreme leftward position, the subcarriage 525 is normally blocked against leftward movement by a lock lever 556 (Figs. 6, 10, 11, 22, 27 and 28). Lever 556 is pivotally mounted by suitable pin and slot connection on the outwardly extending upper portion of a mounting plate 557 which is attached to the right hand side frame of the machine. The rearward end of lever 556 is urged counterclockwise (Figs. 11 and 22) by a stud extending inwardly and mounted on the right hand end plate of carriage 2. The forward end of the lever 556 is provided with an upstanding ear which is in contact with the inner face of the right hand end plate of subcarriage 525. A latching slide 558 slidably mounted on plate 557, is normally held toward the front of the machine by a suitable spring in the position shown in Figure 6, in which position an upstanding extension 558' of said slide is interposed between the vertical face of plate 557 and a central portion of lever 556 thereby preventing leftward movement of said lever at its slot and pin mounting. Thus subcarriage 525 is normally latched in its rightmost position relatively to carriage 2. During a setup operation as will be described, slide 558 is moved to the rear to the position shown in Figures 10 and 11 in which position the extension 558' is moved from blocking position with lever 556 allowing the front end of lever 556 and consequently the subcarriage 525 a degree of leftward movement due to the slot and pin mounting of said lever.

The multiplier storage wheels 524, one for each order of the keyboard 10, are located at the front of the subcarriage 525 and are fixed to gears 536 to the left thereof (Figs. 4 and 22) by suitable rivets. The wheels 524 and gears 536 are rotatably mounted as units on sleeves provided with gears 537 integral therewith and located to the right of said wheels. The gears 537 have yieldable spring connections 538 with the wheels 524 for a purpose hereinafter described, and the gears 536, wheels 524 and gears 537 are normally adapted to be rotated as units on the shaft 539 extending the length of the subcarriage 525. Located to the rear and in constant mesh with the gears 536 are the multiplier storage gears 540 which are rotatably mounted on the splined shaft 527 on which the subcarriage 525 and the parts therein contained are adapted to be shifted as a unit longitudinally of the main carriage 2. The gears 540 are provided with rightwardly extending hubs 541 (Figs. 4 and 22) terminating in end portions of slightly larger diameter. The hubs 541 are provided with recesses 542 (Fig. 3) which are adapted for registration with fingers 543 which are rotatably mounted on the shaft 539. When a value is set in a storage gear 540, the cooperating finger 543 will ride on the periphery of its hub 541, and when the storage gear is counted back to zero, as will hereinafter be described in connection with a program of multiplication, the finger will be urged into the recess 542.

Storage gears 540 are held in adjusted position by click pawls 693, rotatably mounted on shaft 539 and located to the left of gears 536 (Fig. 4). Click pawls 693 are biased counterclockwise (Fig. 3) and clockwise (Fig. 5) by a spring 694 extending the length of subcarriage 525 and threaded through suitable openings in the partition plates thereof, and said pawls are provided with square lugs (Fig. 3) extending to the side from the ends thereof and adapted for engagement with the teeth of storage gears 540. Cams 695 are splined on shaft 527 and are normally in counterclockwise position from the showing in Figure 5 and when in normal position allow engagement of pawls 693 with storage gears 540 (Fig. 3). However, as will be described, when carriage 2 is rocked in any one of the clearout operations, splined shaft 527 is rocked clockwise and thereby rock pawls 693 counterclockwise and out of engagement with storage gears 540 as shown in Figure 5.

The intermediate gears 544, which are in constant mesh with the gears of the numeral wheels 13 of the product dividend register, are rotatably mounted in the main carriage 2 to the rear of subcarriage 525 upon shaft 534 extending the length of the main carriage. The gears 544 are driven by intermediate gears 545 rotatably mounted on a shaft 546 extending between the side plates of the machine, these gears 545 being driven by the digital actuators 5 and the 10's transfer actuators 17. The multiplier storage gears 540 are adapted to be meshed with the intermediate gears 544. However, when the subcarriage 525 is in its normal position to the right and in latched connection to plate 531 (Fig. 22), the multiplier storage gears are disposed a short distance to the right and out of mesh with the intermediate gears 544. Thus it will be seen, that if values set on keys 18 of the keyboard are registered on the wheels 13 of the product dividend register by a + cycle of the machine and the keyboard setting is retained; that if then the multiplier storage gears 540 are brought into mesh with the intermediate gears 544, the values registered on the wheels 13 will be removed therefrom and transferred to the multiplier storage gears and multiplier storage wheels 524 by a — cycle of the machine. However, it is necessary to disengage the multiplier storage gears 540 from engagement with the intermediate gears 544 during the minus cycle, following the completion of the digital actuation and before the 10's carry actuators 17 are effective, otherwise an incorrect transfer will at times result e. g. should the wheel 13 in the units order stand at 9 as from a prior calculation and it is desired to setup the value 1 on wheel 524 of the units order of the multiplier storage devices, upon the + cycle of the machine the units order wheel 13 will be moved to 0 which will effect a tens transfer moving the tens order wheel 13 one step. Now if the multiplier storage wheels 540 were engaged with intermediate gears 544 during both the digital and 10's carry phases of the — cycle, a value of 1 would be transferred to the multiplier storage wheel of the ten's order as well as to the storage wheel of the units order. Thus the multiplier storage wheels would stand at 11 instead of 1.

The means whereby the + and — setup cycles are initiated and controlled, means to shift the subcarriage 525 longitudinally of main carriage in timed relationship to the setup cycles and means whereby the release of keys 18 on keyboard 2 is controlled are set forth in the following:

As has herefore been noted, the main carriage 2, must be in its extreme left hand position for the 2 cycle setup mechanism to effect a multiplier setup and the depressed keys 18 on keyboard 2 must remain set during both the + and — setup cycles. Accordingly, when the carriage 2 is shifted into its leftmost position, a lug 547 (Figs. 6, 22 and 23) located on the right hand end of cover plate 529 is brought in contact with the rearward end of a lever 548 pivotally mounted on a horizontally disposed key plate 549 extending to the right of the right hand side frame. Thus lever 548 is rocked counterclockwise (Fig. 22) against the tension of a suitable spring attached to its forward end. The forward end of lever 548 is provided with an opened end slot in which the upper end of trip lever 421 is positioned. Trip lever 421 (Fig. 8) is located between the driving lever 418 and the right hand side frame, however, lever 418 is positioned a sufficient distance from the side frame to allow lever 421 a degree of lateral movement. Accordingly, when lever 548 is rocked, the upper end of lever 421 is moved outwardly into proper position relative to the bell cranks 433 and 430 (Fig. 22) which when operated serve to terminate a machine cycle and release the keys 18 respectively.

The setup key 526 is located at the right hand side of the keyboard 10 (Fig. 1) and the key stem thereof is provided at its lower end with a slot through which extends a stud 550 (Fig. 8) which is mounted on the side frame. Normally, the setup key is held in its raised position by a suitable spring with the bottom of the slot against the stud 550. The stem of the setup key 526 is further provided at its lower end with a rightwardly extending arm having a trip member 551 pivotally mounted thereon. The trip member is normally biased clockwise by a spring attached to a lug thereof and a pin in the stem of the key 526. The trip member 551 is provided with an upstanding hook portion which is normally positioned above and over a leftward extension of a lower link of a toggle 552, said lower link being pivotally mounted at its lower end to the machine framing (Fig. 6). The upper link of toggle 552 is pivoted at its upper end to the rearward end of a lever 553 which is pivotally mounted on a stud in the side frame on which gear 429 is also mounted. The rearward end of lever 553 is held in raised position when toggle 552 is set, and a spring 554 attached to the forward end of said lever urges said lever clockwise. When the setup key 526 is depressed, the hook portion of member 551 is brought downwardly into contact with the leftward extension of the lower link of the toggle 552, rocking said link counterclockwise (Fig. 8) to break the toggle. As the hook of trip member 551 is moved downwardly to break the toggle, a cam edge of a downward extension of said member contacts a lug 555 (Fig. 6) on the machine frame, rocking member 551 counterclockwise against the tension of its spring. Thus the hook is removed from the path of the leftward extension of toggle 552 after having broken the toggle by contact therewith. This provides that the toggle 552 may be reset while the setup key 526 is held depressed.

When toggle 552 is broken, lever 553 is allowed to be rocked clockwise by spring 554, moving the rearward end downward and the forward end upward to the position shown in Figure 8. The forward end of lever 553 contacts a pin on repeat key 409 and raises said key if it is in depressed position thus rocking plate 411 clockwise into nonrepeat position. At the same time, lever 553 contacts a pin of the trip lever 421, raising said lever, against the tension of a spring at its lower end, to a position in which the upper end of said lever is in a plane with the bell crank 433 (Fig. 8). As the upper end of lever 421 has been moved to the right (Fig. 22) of the overlapping lug of bell crank 430, said lever is positioned to operate bell crank 433 independently of bell crank 430.

Lever 553 is provided at its rearward end with a pin 559 and is adapted to drive a link 560 through a slot in the forward end of said link. The rearward end of link 560 is connected at a common point to cams 561 and 562 which are adapted to rotate as a unit on a stud extending outwardly from plate 557, the stud being in axial alignment with shaft 4 on which gear 403 and actuators 5 are mounted. When the rear end of lever 553 is in its normally raised position, pin 559 is at the forward end of the slot in link 560, thus maintaining cams 561 and 562 in their normal clockwise position (Fig. 6) and the forward end of slide 558 is urged forwardly against pin 559 by its spring to position extension 558' in blocking engagement with lever 556. As pin 559 is lowered on breaking of toggle 552, slide 558 is moved to the rear and out of blocking engagement with lever 556 (Fig. 8). Because of the slot connection with link 560, the pin is ineffective to drive said link, during the first part of its downward movement. However, when pin 559 reaches the rearward end of the slot the link 560 is moved to the rear and thus rocks cams 561 and 562 counterclockwise, to the position shown in Figure 8. The above described counterclockwise rotation of cams 561 and 562 serves to intiate a + cycle of operation and further rotation of said cams in the same direction which is effected as the machine makes its overrun to terminate the + cycle, serves to move the subcarriage 525 to the left and initiate a — cycle of machine operation as follows:

An arm 563 (Figs. 6, 8 and 10) is pivotally mounted at its lower end on plate 557. The upper end of arm 563 terminates in a nose which is urged counterclockwise by spring 565 into contact with cam 562. Pivotally mounted on arm 563 intermediate its nose and its pivot is a lever 564 which is provided at its upper end with a roller which is normally in contact with cam 561. To the rear of arm 563 and lever 564 and pivotally mounted on the plate 557 is a lever 566 which is urged counterclockwise against a fixed stop by a spring attached to a horizontally disposed arm thereof. Lever 566 is provided with an upstanding arm which is adapted for cooperation with lever 564 but is normally out of contact therewith (Fig. 6).

The lever 564 is provided with a slot at its lower end through which extends the rightmost end of a lever 567 (Fig. 31) which extends across the machine and terminates at its leftmost end in two spaced ears 568. Lever 567 is pivoted intermediate its ends on a bracket mounted between the side frames of the machine. The ears 568 of lever 567 are positioned on either side of pin 145 of clutch lever 111, said pin extending inwardly through a suitable opening in the left hand side frame. The ears 568 are normally out of contact with pin 145 and are sufficiently spaced to allow clutch lever 111 to be moved to either of its active positions without interference from said ears. However, when lever 567 is rocked in either direction by lever 564, as will be described, the movement is sufficient to cause either one or the other of ears 568 to contact pin 145 thus moving clutch lever into either of its active positions.

When cams 561 and 562 have been initially rotated counterclockwise as described, cam 561 rocks lever 564 clockwise about its pivot on arm 563 (Fig. 8) by contact with the roller on said lever. Thus lever 567 is rocked clockwise (Fig. 31) and clutch lever 111 (Fig. 15) is moved clockwise through its pin 145 and a plus operation of the machine is initiated. A latch 569 pivotally mounted on plate 557 and spring biased counterclockwise is provided with a depending lug which rests on the upper face of the end of lever 567 when said lever is in its normal position. However, when lever 567 is moved to active position, as described, above the lug of the latch 569 drops behind said lever latching it in the rocked position. Furthermore, the upper end of lever 564 (Fig. 8) has been brought into abutment with the upstanding arm of lever 566 but the movement is not sufficient to move lever 566 clockwise from its fixed stop. Cam 562 has thus far been ineffective to move arm 563 from its normal position as the nose of the arm is still in contact with the dwell of the smaller diameter of the cam edge. However, the cam 562 has been brought into position to move the arm 563 upon further counterclockwise rotation (Fig. 8). Cam 562 is provided integrally therewith with an extension comprising another cam 562' (Figs. 8, 10, 11 and 12). Cam 562' is adapted to move plate 531 to the left (Fig. 22) by contact with a depending nose on the forward end of the plate. When the cams 562—562' are initially rotated as described in the foregoing, the cam 562' is brought into position where upon further counterclockwise rotation it will be brought into contact with the nose of the plate 531 (Fig. 8).

The clutch lever having now been moved to its plus position, the machine will cycle once to register values set on keys 18 on the wheels 13 of the product dividend register and to register a count of 1 on the units wheel 85 of the multiplier quotient register. The machine has been set for nonrepeat as previously described and the trip lever 421 (Figs. 8 and 9) is moved to the left by cam 419, said lever operating bell crank 433 independently of bell crack 430 to terminate the cycle and leave the keys 18 in set position. As the machine cycled, a double gear 570 is driven in a clockwise direction (Figs. 6, 8 and 10) at a one to one ratio with the digital actuators 5 and tens transfer actuators 17 by the driving gear 403 of the digital actuators. A pin 571 mounted on the outer gear of the double gear 570 moves idly until near the completion of the 10's transfer actuation at which time it is moved into contact with the upper surface of an arm 572 integral with cam 562 and normally extending to the left thereof (Fig. 6). As the arm 24 (Fig. 15) is carried to the fixed stop 29 by the stopping operation of the plus cycle, pin 571 drives cams 561 and 562 through arm 572 further in a counterclockwise direction, to the position of the parts as shown in Figure 10. The lower link of the toggle 552 is provided with an arm extending to the right thereof and said toggle is broken. However, due to the pin and slot connection of the lower link with the upper link of toggle 552, pin 571 during its clockwise rotation, will rock said lower link idly in a counterclockwsie direction. Furthermore, the second step of rotation of cams 561 and 562 moves link 560 to the right thus bringing the leftward end of the slot in said link adjacent pin 559 of lever 553 (Fig. 10).

Cam 562' in the above described movement, urges the forward end of plate 531 to the left from the dot dash normal position to the full line position as shown in Figure 12 which position is also shown in Figure 11. Thus carriage 525 is moved to the left, longitudinally of carriage 2, to engage multiplier storage gears 540 with intermediate gears 544 in the manner previously described. As shown in Figure 10, cam 562 rocks arm 563 clockwise against the tension of spring 565 about the pivot at its lower end. The lower end of lever 564 is restrained from rightward movement by the end of lever 567 which is latched in the left or plus position by latch 569. Consequently, the upper arm of lever 564 is carried to the right by arm 563 and thus rocks lever 566 clockwise against the tension of spring 566'.

As the arm 24 is carried against the fixed stop 29, arm 429 (Figs. 8 and 10) is rocked in a counterclockwise direction as heretofore described. Arm 429 is provided with an extension 429' and as arm 24 completes its movement to the stop 29, the extension 429' contacts and raises latch 569 thus removing its lug from latching engagement with the lever 567. From an inspection of Figure 10, it will be seen that when latch 569 is raised to release lever 567, spring 566' will rock lever 566 in a counterclockwise direction. Lever 564 will, therefore be rocked counterclockwise about its pivot on arm 563 which is held stationary by its spring 565 against cam 562. Lever 564 will thus move the end of lever 567 to the right rocking said lever in a counterclockwise direction (Fig. 31) urging one of the ears 568 against the pin 145 of the clutch lever 111. However, as the clutch lever is held in its neutral position by extension 144, the contacting ear 568 will be ineffective to rock said lever. Nevertheless, as arm 24 returns from stop 29, extension 144 will be removed from restraining engagement with pin 145 of clutch lever 111 and arm 567 will be allowed to move further in counterclockwise direction thus rocking said clutch lever 111 counterclockwise into its minus position. Furthermore, as arm 24 returns from the stop 29, arm 429 is rocked clockwise (Fig. 10) allowing latch 569 to be spring urged downwardly with its lug to the left of the end of lever 567 thus latching said lever to the right in its minus position.

A minus cycle of the machine having been initiated in accordance with the foregoing, the values registered on the wheels 13 of the product dividend register are removed therefrom and transferred to the multiplier storage gears 540 and wheels 524. Furthermore, the count of one effected in the multiplier quotient register by the plus cycle will be removed therefrom by the minus cycle. For reasons heretofore explained, the storage gears 540 must be disengaged from the intermediate gears 544 at the end of digital actuation and before the tens transfer actuation is effective. Accordingly, a latching segment 573 (Figs. 6, 10, 11 and 12) fixed to the hub of actuator driving gear 403 is adapted to retain plate 531 and consequently carriage 525 in its engaged position until completion of the digital actuation and to release said carriage before the tens transfer actuation is effective. When cam 562' was effective to move plate 531 (Fig. 10) during the plus cycle, the segment 573 was out of the path of the nose of said plate. However, during the minus cycle the segment is moved into the path of and is positioned to the right of (Fig. 12) the nose of the plate 531. Accordingly, when cam 562' is removed from restraining control with plate 531 said plate will be held in position by segment 573 until it is released at the proper time in the cycle. The foregoing and the restoration of the various parts to normal during the minus cycle is accomplished as follows:

Gear 403 and segment 573 are rotated in a clockwise direction (Figs. 8 and 10) thus bringing the segment into the path of the nose on the forward end of plate 531. The double gear 570 is rotated counterclockwise and its pin 571 is brought into contact with the top of the arm of the lower link of toggle 552, thus rocking said link clockwise to restore the toggle. Lever 553 is therefore rocked counterclockwise to normal and as its forward end is lowered, trip lever 421 is moved downwardly by the spring at its lower end. The pin 559 of the rearward end of lever 553 accordingly through link 560 rocks the cams 561, 562, 562' and arm 572 clockwise to normal, thus allowing arm 563 to be rocked counterclockwise by spring 565. As the lower end of lever 564 is held to the right in minus position by latch 569, the upper end will be carried to the left with arm 563 until the roller on the upper end is brought into contact with cam 561. However, arm 563 will not be allowed its full counterclockwise movement to its normal position until the lower end of lever 564 is allowed to move to the left to its normal position. Also at this time, pin 559 will be moved from restraining engagement with slide 558. Nevertheless, the spring of the slide will be unable to restore it to normal until the subcarriage 525 is released.

As gear 403 and segment 573 are further rotated clockwise in the minus cycle, segment 573 is removed from the path of the nose of plate 531 at the completion of the digital actuation and before the tens transfer actuators 17 are effective. With reference to Figure 22, it will thus be seen that spring 533 will move plate 531 and subcarriage 525 to the right disengaging multiplier storage gears 540 from intermediate gears 544. Lever 556 is now free to be moved to the right and accordingly slide 558 is now moved forward by its spring thereby causing arm 558' thereof to displace said lever to the right and be moved into normal blocking engagement therewith.

The machine, as has been described, is set for nonrepeat and cam 419 operates to terminate the minus cycle through trip lever 421. However, as trip lever 421 has been lowered when toggle 552 was restored, the lever now operates bell crank 430 which because of its overlying lug (Fig. 9) simultaneously operates bell crank 433 to release the keys 18 on keyboard 2 and to stop the machine.

As has heretofore been noted, a value may be retained on the keyboard as a multiplicand, if the operator holds setup key 526 depressed until the completion of the setup cycles. To this end, a lever 574 (Fig. 6) is pivoted to the frame of the machine adjacent the lower end of the stem of setup key 526 and the trip lever 421. The stem of key 526 is provided with a laterally extending pin 575 which is adapted to contact the rightward arm of lever 574. The leftwardly extending arm of lever 574 is in contact with the bottom edge of trip lever 421. Therefore, if key 526 is held depressed, lever 574 is held in clockwise rotated position by pin 575 and the leftward arm of said lever will be in supporting contact with the bottom edge of lever 421, thus holding it in raised position after toggle 552 has been restored. Lever 421 will then act only on bell crank 433, to stop the machine.

In the stopping operation, as described, latch 569 will be raised and spring 565 will now restore the arm 563 and lever 564 to the normal position as shown in Figure 6.

As will readily be understood from the foregoing description, the plus and minus setup cycles may be employed to effect a dividend setup by registration on wheels 13 of the product dividend register, if the set keys 18 on the keyboard are released at the termination of the plus cycle, particularly since the minus cycle will serve to remove the count of one from the multiplier quotient register. From an inspection of Figure 22, it will be seen that if carriage 2 is shifted to the right, the lug 547 will be removed from contact with the rearward end of lever 548 and that said lever will then be rocked clockwise by the spring at its forward end. Accordingly, the nose of trip lever 421 will be moved to the left in which position it will be effective to contact the lug of bell crank 430 when it is either in its raised or lowered position. Thus bell cranks 430 and 433 are simultaneously operated to terminate the plus cycle and to release set keys 18 on the keyboard. Furthermore, when the carriage 2 is positioned to the right, the nose of plate 531 will then be to the right and out of the path of cam 562 and latch segment 573 both of which are without function during a dividend setup operation.

CARRIAGE RETURN WITH MULTIPLIER OR DIVIDEND SETUP

As a multiplier setup is effected only with the carriage 2 in the extreme left hand position, as described, the carriage is ready to be shifted to the right from that position in the performance of multiplication, and as a dividend setup may be effected in any position other than the extreme left, the carriage is intended to be shifted to the left from the setup position in the performance of division. Also, as fully disclosed in the co-pending application, Serial No. 3,548, filed of even date herewith, a calculation of multiplication or division is followed by an automatically initiated clearout cycle whereby set keys 18 on keyboard 10 are released. Thus the keyboard is cleared and a new value may then be set on keys 18 to be registered as either a multiplier or a dividend by the setup mechanism.

Upon depression of any one of the multiplier keys 587, 588, 589 or the division key 590 devices are set which are adapted for operation in connection with the carriage shift, and two cycle multiplier dividend setup mechanisms. As fully disclosed in the aforesaid copending application, an operation initiated by depression of the multiplier key 587 is followed by an automatic return of carriage 2 to the extreme left hand position. Therefore, as will presently appear, the carriage return devices herein disclosed are adapted to be operated in a setup following an operation initiated by multiplier keys 588 and 589 or division key 590.

Accordingly, with carriage 2 in a shifted position to the right and the keyboard cleared following a multiplication initiated by either the plus multiplier key 588 or minus multiplier key 589, a value to be registered in multiplier storage wheels 524 and gears 540 may be set on keys 18 of the keyboard. Then upon depression of key 468 (Fig. 1 designated "C. P. Set up") simultaneously with the depression of clear keys 465 and 467, a clearout cycle will be effected which will clear the multiplier quotient wheels 85 and the product dividend wheels 13 in carriage 2. The clearout cycle will automatically bring about depression of the left shift key 370, returning the carriage 2 to its extreme left hand shifted position. When the shift has been terminated, the two cycle setup mechanism is then automatically thrown into operation thus effecting a multiplier setup. It is then only necessary to set a multiplicand on the keyboard and another calculation may be initiated.

Following an operation in division, the same procedure as above outlined is adapted to be performed. Of course, however carriage 2 will be returned to the right followed by a setup in the product dividend wheels 13. It will also be apparent that upon the setting of one of the tabulating keys 402 the carriage may be returned to a position intermediate the extremes, followed by a dividend setup in that position.

It may be well to note at this point that the simultaneous depression of C. P. setup key 468 with one or more of the clearout keys 465, 466 and 467 is necessary to effect the carriage return setup operation as outlined above and that depression of key 468 alone will not affect the position of the carriage but will initiate an operation of the two cycle setup mechanism substantially as described in connection with setup key 526. Furthermore, in the normal operation of the machine, it is intended that key 468 be depressed simultaneously with clearout key 465 and/or 467 (Fig. 1) and to facilitate this operation the keys have been grouped accordingly at the right hand corner of the keyboard.

The program of operations as outlined in the foregoing is accomplished as follows:

As described in the last mentioned co-pending application, depression of multiplier keys 588 or 589 will rock shaft 591 (Figs. 16 and 31) counterclockwise. Shaft 591 is located at the lower front and extends between and to a distance beyond the side frames of the machine. Shaft 591 is provided with a crank 592 fixed thereon and located a short distance inwardly of the right hand side frame. A slide 593 is attached at its forward end to crank 592 and is provided with an open end slot at its rear whereby it is slidably mounted on a stud 594 which extends inwardly of the right hand side frame. Another slide 595 (Figs. 3 and 31) is provided with an open end slot at its forward end and is also slidably mounted on and supported by stud 550. Slide 595 is further provided with a slot toward the rear through which extends a supporting and guide pin mounted in the frame of the machine. Slide 595 is adapted for two settings; namely, toward the front as shown in the full line position in Figure 3 and to the rear as indicated by the dot dash position. It will be noted that slide 595 has pin connection with a toggle spring 595' which acts to retain said slide in either of its set positions.

Mounted on the rear and extending downwardly from slide 595 is the tightly wound spring 596. The lower end of spring 596 is not anchored, but extends downwardly through a hole located on the end of an inwardly extending arm of a rocker 597. Rocker 597 is pivotally mounted on a bracket (Fig. 16) which is mounted on the outer face of the right hand side frame, and its inwardly extending arm which has connection with spring 596 passes through a suitable opening in the side frame. Rocker 597 is adapted to be rocked in a plane substantially parallel to that of the keyboard, but is normally held in its central or neutral position by a lever 598 (Fig. 6). Lever 598 is pivotally mounted on stud 550, which extends outwardly from the right hand side frame, and is provided at its rearward end with a recess 598' in the lower edge thereof. When the rearward end of lever 598 is held downwardly in its normal position by spring 599, an outwardly extending arm of rocker 597 is positioned within said recess preventing said rocker from being moved from its central position. A lever 600 (Fig. 31) pivotally mounted on the outer face of the side frame is provided with a downwardly extending arm which terminates in an inwardly bent portion adjacent the inwardly extending arm of rocker 597 and has slot connection with the lower end of spring 596. Lever 600 is further provided with a rearwardly extending arm which by contact with stop 601 will prevent said lever 600 from counterclockwise movement (Fig. 31) when carriage 2 is in the extreme left hand position and from clockwise movement when said carriage is in the extreme right hand position as will hereinafter be described.

Accordingly, when shaft 591 is rocked counterclockwise by either multiplier key 588 or 589, slide 593 will be moved by crank 592 toward the rear of the machine. If slide 595 is in its forward position, a pin 601 on slide 593 will by abutment with the forward end of slide 595 move said slide to its rearward position as indicated by the dot dash lines in Figure 3. Spring 596 will now urge rocker 597 in a clockwise direction and lever 600 counterclockwise (Fig. 31) as the spring tends to assume the straight line position as indicated by the dot dash lines in Figure 3. However, rocker 597 is restrained from movement by the recess 598' of lever 598, and spring 596 will remain at this time with its lower end displaced from alignment with its upper end. Thus setting of slide 595 to the rear by the initiation of a problem in multiplication, conditions the machine for the carriage return multiplier setup operation, which is effected as follows:

In connection with a clearout cycle by keys 465, 466 or 467 as described, shaft 484 (Figs. 16 and 31) is rocked counterclockwise and then clockwise back to normal, the first movement being effective to clear the indicated wheels or keyboard. A crank 602 (Figs. 16 and 31) fixed on shaft 484 has yieldable link connection 603 with a depending crank 604 which is integral with a rearwardly disposed hub of an arm 605. The hub of arm 605 is provided with a circumferential slot and is rotatably mounted and adapted for lateral displacement on a stub shaft 606 extending outwardly from the right hand side frame. A pin in the end of a forwardly extending arm of rocker 597 is positioned in the slot of the hub of arm 605. Thus it will be seen from an inspection of Figure 31 that when rocker 597 is rocked in either direction arm 605 will accordingly be moved laterally either to the right or to the left on shaft 606. The forward end of arm 605 (Figs. 16 and 17) is normally positioned between and out of contact with pins 369' and 370' which are located in the lower ends of the stems of right and left carriage shift keys 369 and 370 respectively. Thus, when a clearout cycle is initiated by depression of one of the keys 465, 466 or 467, shaft 484 through crank 602, link 603 and crank 604 will rock arm 605 clockwise (Fig. 16) to a position above pins 369' and 370' and back counterclockwise to normal without contacting the said pins. However, when key 468 (Fig. 6) is depressed simultaneously with keys 465 and 467 to effect the carriage return setup operation, a lever 607 having connection at its forward end with the lower end of the stem of key 468 is rocked counterclockwise about its pivot on shaft 550. Lever 607 is disposed to the rear of lever 598 and has at its rearward end a forwardly extending lug 607' which underlies and is normally in contact with the lower edge of the lever 598. Thus when lever 607 is rocked counterclockwise, lever 598 is likewise rocked by lug 607'. Lever 607 is further provided at its rearward end with an upstanding arm 608 which is normally positioned just below the rearwardly extending arm of the lower link of toggle 552. Accordingly, when lever 607 is rocked, arm 608 is brought into contact with the arm of toggle 552 thus breaking said toggle which will normally initiate an operation of the 2 cycle setup mechanism as previously described. However, the rearward end of lever 598 has been raised by lever 607 into position (Fig. 7) to block the leftward movement of lever 567 which would normally be effected by clockwise movement of lever 564 (Fig. 8) by cam 561, said cam at this time being effective only to rock arm 563 clockwise by contact with the roller at the upper end of lever 564. Consequently, the 2 cycle setup operation is initiated by breaking the toggle 552 but the effective operation thereof is held up as long as lever 598 is held in blocking engagement with lever 567.

Latch 609 (Figs. 6 and 7), which is described in connection with multiplication including automatic carriage return, serves to hold lever 598 in its rocked position until the left shift key 370 is depressed to initiate carriage return. In the normal operation of the carriage return setup devices, herein disclosed, latch 609 would also be released when the return shift is initiated, by operation of the lever 368. However, when carriage 2 is in either the extreme left or right hand position and slide 595 (Fig. 31) is set for return shift in that direction, stop 601 and lever 600 will prevent rocker 597 from movement in the direction which allows arm 605 to depress the indicated carriage shift key as follows:

Stop 601 (Figs. 16 and 31) is mounted at the end of a bar 613 which is slidably mounted in suitable slots at the upper rear of the side frames of the machine and extends beyond the frames at either end. The bar is centrally located by two springs 614, one of which is shown in Figure 31. When carriage 2 is in any position intermediate the extreme right and left, two spaced lugs of stop 601 allow vertical movement of the arm of lever 600 in either direction, thus allowing said lever to be rocked in either direction. However, when the carriage is in the extreme left hand position, the head of a screw 615 mounted on the inner face of the right hand end plate of the carriage will be brought into contact with the end of bar 613 moving the bar to the left. This causes the upper lug of stop 601 to be positioned over the end of the arm of lever 600. Thus lever 600 is blocked from counterclockwise rotation and hence rocker 597 from clockwise movement (Fig. 31). As will be apparent, however, lever 600 will be free to be rocked in a clockwise direction.

Conversely, when the carriage is shifted into the extreme right hand position, stop 601 will be moved to the right, positioning the lower lug of said stop beneath said arm whereby clockwise rotation of lever 600 is prevented but counterclockwise rotation is permitted. This provision is necessary as it will presently appear that the depressed carriage shift key 369 or 370 is released by movement of arm 24 (Fig. 15) to the fixed stop 29, and as described in connection with the carriage shift devices, said movement of arm 24 is effected as a result of the movement of the carriage as it is shifted into either of its extreme positions or into a position indicated by a depressed tabulating key 402 (Fig. 25). Consequently, if a shift key were depressed with the carriage in the extreme position indicated by said key, no movement of the carriage would take place and the key would be held indefinitely depressed. Accordingly, it is necessary to render latch 609 ineffective upon operation of the carriage return setup devices. To this end, lug 607' of lever 607 (Fig. 7) is brought into contact with latch 609 thus rocking said latch clockwise out of contact with lug 610 of lever 598 when lever 607 is rocked.

Another latch 611 (Figs. 6 and 7) is provided, which will hold lever 598 in rocked position during the clearout cycle preceding carriage return. Bell cranks 473 and 475 (Fig. 31) are rocked counterclockwise, as described, in the clearout operation of the multiplier quotient wheels and product dividend wheels. Outwardly extending arms of the bell cranks 473 and 475 are thus moved to the right (Fig. 7) and by contact with a depending arm of a lever 612 will rock said lever counterclockwise about its pivot, against the tension of a suitable spring. Lever 612 is provided with another arm which has spring connection with a forwardly extending arm of latch 611. Thus when a lever 598 is rocked, latch 611 will be urged clockwise beneath lug 610, holding lever 598 in rocked position when lever 607 is restored by release of key 468.

When lever 598 has been rocked as described in the foregoing, recess 598' is removed from restraining engagement with the outwardly extending arm of rocker 597. Spring 596 which is conditioned to move rocker 597 in a clockwise direction and lever 600 counterclockwise (Fig. 31) now will act accordingly. However, as rocker 597 through its pin connection moves arm 605 to the left on shaft 606, no appreciable movement is effected since the leftward face of the arm 605 is brought into abutment with the pin of the stem of the left shift key 370 (Fig. 17). As shaft 484 is rocked counterclockwise in the clearout operation, arm 605 is rocked clockwise by the link connection 603, whereby said arm is raised above the pin of left shift key 370. Accordingly, arm 605 is allowed further movement to the left until restrained by the stem of key 370. As shaft 484 is rocked clockwise back to normal, arm 605 will be rocked counterclockwise and therefore by engagement with the upper side of the pin of left shift key, pull said key downwardly and thus initiate a return carriage shift to the left.

Furthermore, as the clearout cycle is completed, lever 612 (Fig. 21) is rocked clockwise by its spring to normal, thus removing latch 611 from engagement with lug 610 of lever 598. However, when rocker 597 is moved clockwise, the outwardly extending arm thereof is moved to the left of the recess 598' of lever 598. Accordingly, when lever 598 is released by latch 611, the lower edge of said lever to the left of recess 598' will rest upon the outwardly extending arm of rocker 597. Thus lever 598 is held in rocked position with its rearward end maintained in blocking engagement with lever 567 until the termination of the return shift.

As carriage 2 is shifted into the extreme left hand position and the shift terminated, as was described in connection with the carriage shift mechanism, arm 24 (Fig. 15) is carried against fixed stop 29, and arm 429 (Figs. 8, 21 and 31) is rocked counterclockwise. Rocker 597 (Fig. 31) is provided with an open end slot extending to and flaring outwardly at the rear. As arm 429 is rocked counterclockwise, the extension 429' by reason of the flared portion will enter said slot, thereby moving rocker 597 counterclockwise back to its central position. Rocker 597 will, therefore move arm 605 to the right, out of engagement with pin 370' of left shift key 370, thereby releasing said shift key. Furthermore, the outwardly extending arm of rocker 597 will be moved to the right from the position shown in Figure 21, and the rear end of lever 598 will be moved downwardly by spring 599 to engage slot 598' with the arm of rocker 597 thereby locking the rocker in its central position against the tension of spring 596. When lever 598 is thus restored to normal, its rearward end will be removed from blocking engagement with the end of lever 567, and, as toggle 552 was broken at the start of the operation by depression of key 468, a multiplier setup operation will be initiated in accordance with the operation described in connection with the 2 cycle multiplier dividend setup mechanism.

Upon depression of divide key 590 (Figs. 1 and 31), as described in the co-pending application Serial No. 8,548, filed of even date herewith, shaft 616 (Fig. 31) is rocked counterclockwise. Shaft 616 extends between the side frames of the machine and fixed thereon is an upstanding arm 617 adjacent the inner face of the right hand side frame.

The upper end of arm 617 is adapted for contact with a lug at the under side of slide 595. Therefore, when shaft 616 is rocked, if slide 595 is in its rearward or left shift carriage return position, said slide will be moved toward the front of the machine to the position shown in Figures 3 and 31. The setting thus effected provides for right shift carriage return; the upper end of spring 596 being moved toward the front of the machine, thus urging rocker 597 in a counterclockwise direction (Fig. 31), so that arm 605 will act to depress the right shift key 369.

When a program of division is initiated and the carriage return shift setting effected in accordance with the foregoing, the carriage 2 is shifted toward the left until the operation is terminated by depression of stop key 618 (Figs. 1 and 31) or the carriage is shifted into the extreme left hand position. When the operation is terminated as described, the keyboard is automatically cleared so that another value may be set on keys 18, to be registered in the product dividend wheels 13 as a new dividend. It will now be apparent that upon depression of keys 465, 467 and 468, a carriage return, dividend setup operation will be effected and that the program of operations will be substantially the same as that described in connection with the carriage return multiplier setup operation.

MULTIPLIER DIVIDEND SETUP (1 CYCLE)

Figure 32:
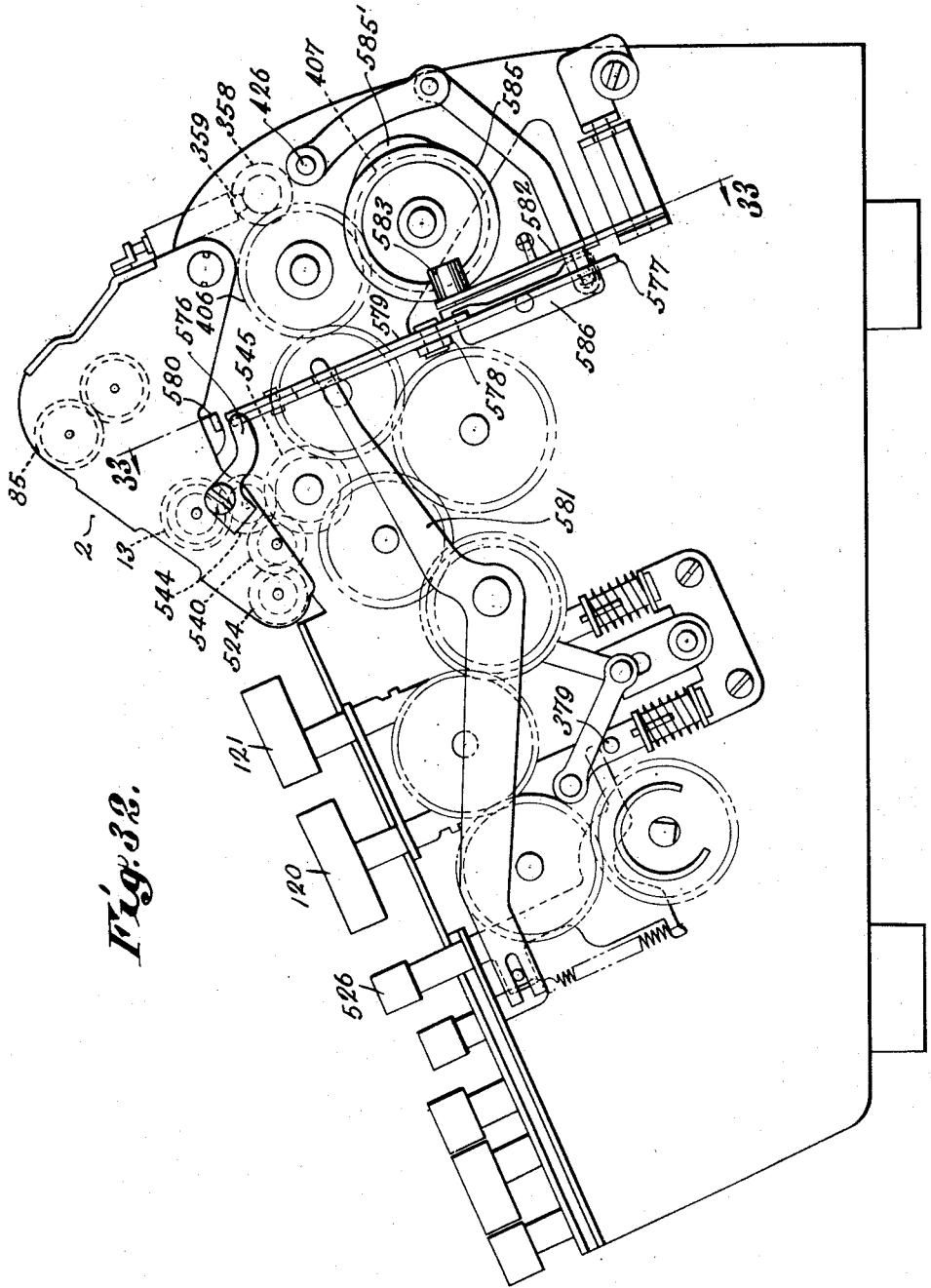
Fig. 32 is a right side elevation of the machine illustrating a modified or one cycle setup mechanism.

A modified form of the setup means herein before described is illustrated in Figure 32 of the drawings.

The single cycle setup mechanism herein disclosed operates to set up a value set on keys 18 of the keyboard 10 alternatively in the multiplier storage wheels 524 and the storage gears 540 in the carriage 2 or in the wheels 13 of the product dividend register of the carriage, the position of the carriage determining whether the setup operation will be effective to set up a multiplier or a dividend (Figs. 32, 33, 34 and 35).

Upon depression of the setup key 526, an arm integral therewith and extending to the rear contacts a pin 379 in the stem of the plus key 120 thereby depressing said key and initiating a single plus cycle of operation. Furthermore, upon depression of setup key 526, a change lever (not shown), should it be in either of its active positions, is moved into its central or neutral position so that no count will be effected in the wheels 85 of the multiplier quotient register. When the change lever is thus moved to neutral position by setup key 526 provision is made that the machine will be limited to a single cycle of operation and that keys 18 will thereupon be released. Reference is had to my co-pending application Serial No. 762,614, filed July 22, 1947, which fully discloses and describes the above operations.

The intermediate gears 544 (Figs. 32 and 33) mounted in carriage 2 and adapted to drive the product dividend wheels 13 are normally in engagement with the intermediate gears 545 mounted on shaft 546 extending between the fixed side frames of the machine. The intermediate gears 545 are driven by the digital actuators 5 and the 10's transfer actuators 17 are shown in Figure 2. It will therefore be apparent that a plus cycle of actuation will cause values set on keys 18 to be registered in the product dividend dials. However, when the carriage 2 is in the extreme left hand position (right hand as viewed in Fig. 33), the mechanism provides that upon depression of the setup key 526, the registration will be effected on the multiplier storage wheels 524 and storage gears 540.

The construction of the storage wheels and gears is substantially as described in connection with the two cycle setup mechanism in which the wheels and gears are mounted in a subcarriage mounted in the main carriage 2. However, as herein disclosed, the storage wheels 524 and gears 540 are mounted directly in the carriage 2 and are in fixed longitudinal relationship to the intermediate gears 544 and product dividend wheels 13 mounted in said carriage. The multiplier storage wheels 524 (Fig. 32) are located at the front of the carriage 2 and are adapted to be driven by the storage gears 540 to the rear. The storage gears 540 are located a short distance to the right (to the left as viewed in Fig. 33) of the intermediate gears 544 which are normally in mesh with the intermediate gears 545 in the body of the machine. With reference to Figure 33, it will be noted that the figure is taken on a section as viewed from the rear of the machine and accordingly transverse directions will hereinafter be made with reference to this figure. From an inspection of Figures 32 and 33, it will be seen that if the carriage 2 is displaced transversely a short distance to the right, the intermediate gears 544 will be removed from engagement with the intermediate gears 545 and that the storage gears 540 will then be brought into engagement with intermediate gears 545. Therefore if then a plus cycle of operation is effected the registration will be made upon the storage gears 540 and wheels 524.

Carriage 2 is shifted by worm 358 (Fig. 35) which engages a plunger 359 mounted on the rear of the carriage by carriage shift mechanism heretofore described. As will be seen in Figure 35, when the carriage 2 is in its extreme shifted position, plunger 359 is at the end of the worm so that the carriage may be displaced further in the same direction while the worm remains stationary. Displacement of the carriage with the consequent disengagement of intermediate gears 544 with intermediate gears 545 and the engagement of storage gears 540 with intermediate gears 544 to effect a multiplier setup is achieved as follows:

Referring to Figures 32 and 33, the carriage 2 is provided with an arm 576, rigidly attached to the outer face of the end plate of the carriage. Arm 576 extends downwardly from carriage 2 and a lever 577 pivotally mounted on a bracket 578 extending outwardly from the side frame of the machine has its upper end adapted for contact with the inner face of arm 576 when the carriage is in its extreme right hand position (Fig. 33). Slidably mounted on lever 577 by suitable slot and pin connection is an arm 579 which when in its normal or lowered position extends upwardly to a height substantially that of the lever 577 on which it is mounted. A lug 580 mounted on a partition plate spaced inwardly from the end of the plate of the carriage is provided with an outwardly extending shoulder which is located above and to the right of the upper end of arm 579 when said arm is in its normal lowered position. A lever 581 (Fig. 32) pivoted to the side framing of the machine extends rearwardly through a slot in lever 577 and into another slot in arm 579 whereby it is adapted to raise and lower said arm. The forward end of lever 581 has slot and pin connection with setup key 526. Thus when key 526 is depressed to initiate a plus cycle of operation, a lever 581 is rocked counterclockwise and arm 579 is raised to a position in which its upper end is in a plane with the shoulder of lug 580. A lever 582 pivotally mounted on a bracket on the side frame below lever 577 has slot and pin connection above its pivot with the lower end of said lever 577. Lever 582 is provided with a roller 583 at its upper end and is urged inwardly by a spring 584 with roller 583 normally in contact with the depressed portion of the edge of a cam 585 to locate the differential actuators of the machine in full cycle position (Fig. 32).

When a plus cycle of the machine is initiated and arm 579 is raised by depression of the setup key 526 as was described, cam 585, which is fixed to gear 407, is driven in a counterclockwise direction at a one to one ratio with the digital and 10's transfer actuators through a train of gears comprising gears 407, 406 etc. Cam 585 accordingly rocks lever 582 counterclockwise (Fig. 33) clockwise (Fig. 34) a distance sufficient to bring the free end of the arm 582' a slight distance outward from the face of the side frame of the machine. Lever 577 is thus rocked clockwise (Fig. 33) moving its upper end and with it the upper end of arm 579 toward the right. The upper end of arm 579 will then be brought into contact with lug 580 thus moving carriage 2 to the right. As carriage 2 is moved to the right, intermediate gears 544 will be disengaged from intermediate gears 545 and multiplier storage gears 540 will be moved into engagement therewith. A cycle of the machine is divided into phases namely; idle, digital and tens transfer and the above described movement is achieved during the idle phase, when the intermediate gears 545 are stationary. Since lever 582 cooperates with cam 585 in locating the differential actuators at the conclusion of every operation of the machine, means are provided for disabling this locator during continuous cycling. Lever 582 is provided with an arm 582' which normally extends inwardly through an opening in the side frame of the machine and has its forward face adjacent the forward edge of the opening. The lever 582 is allowed a degree of lateral movement on its pivot and as cam 585 is further rotated in the cycle an auxiliary cam 585' moves lever 582 to the left (Fig. 34). Thus the end of arm 582' will be moved to the left of the opening in the side frame. This provides that when the machine is cycled a plurality of times in the calculation of a problem, the end of arm 582' will be brought into abutment with the side frame thus preventing roller 583 from being urged to the lower part of cam 585 until the operation is terminated.

Upon the completion of the multiplier entering cycle, as at the conclusion of any registering operation, the stopping means will be operated. As arm 24 is carried to the fixed stop 29 in the stopping operation (Fig. 19), shaft 426 extending across the machine will be rocked clockwise (Fig. 32) and through suitable linkage will rock a lever 586 (Figs. 32 and 34), which is pivoted on the side frame, clockwise. The upper end of lever 586 will contact arm 582' and thus moving it and the lever 582 to the right whereby the end of said arm will be removed from abutment with the machine side frame. Spring 584 will now be free to move lever 582 clockwise (Fig. 33) and as arm 24 returns from the fixed stop 29, roller 583 will be urged to the lower portion of cam 585, thus locating the machine in full cycle position. Furthermore, as lever 582 is restored to normal, lever 577 will be rocked counterclockwise (Fig. 33) and by contact with arm 576 will move carriage 2 back to normal, disengaging storage gears 540 and engaging intermediate gears 544 with intermediate gears 545.

It will be readily seen from an inspection of Figure 31, that if carriage 2 is shifted to any position to the left thereof, arm 579 will be ineffective when raised to contact lug 580. Thus a setup operation will be effective to register a dividend in the wheels 13 of the product dividend register.

For subject matter herein disclosed and not claimed, reference is made to applicant's co-pending applications, Serial No. 8,544, relating to carriage tabulating means and shift direction control; Serial No. 8,545 relating to constant factor means; Serial No. 8,548 relating to registration and shift control; and Serial No. 57,943, relating to product transfer means.

I claim:

1. In a calculating machine having a fixed frame, a main carriage mounted on and transversely shiftable relative to said frame, a product dividend register on said carriage, differential actuators on said frame, and intermediate gears between said actuators and the product dividend register; a subcarriage mounted upon and longitudinally shiftable relative to the main carriage, multiplier storage wheels on said subcarriage and provided with gears, spring means normally holding said subcarriage in position with the multiplier storage gears out of mesh with the intermediate actuator gears, and a contact member mounted on the fixed frame and operable in one extreme shifted position of the main carriage to hold the subcarriage displaced, against the tension of its spring, with the multiplier storage gears in mesh with the intermediate actuator gears.

2. In a calculating machine having a fixed frame, a carriage transversely shiftable relative to said frame, a power train operable to shift the carriage into one extreme position, a product dividend register shiftable with said carriage by said shift train, rotary differential actuators on said frame, intermediate gears between said actuators and the product dividend register, and a counting finger on said frame driven in time with the actuators; multiplier storage wheels on said carriage denominationally shiftable therewith into successive operative relation with said counting finger and provided with gears normally located out of mesh with the intermediate actuator gears, a normally inoperative carriage displacing train including a cam driven in timed relation with the rotation of the differential actuators, a contact member on the carriage located, in said extreme shifted position of the carriage, in the path of movement of said displacing train and operable by said cam to displace the carriage and thereby mesh the multiplier storage gears with the intermediate actuator gears, manually operable setup devices, means operable by said setup devices to adjust the displacing train into operative position, means including a spring urged element settable by the setup devices to initiate actuator rotation, a member adjustable by the setup devices to block the spring urged initiating element from operation, connections operable by the setup devices to initiate operation of said power train, and means operable in response to movement of the carriage into said extreme shifted position to terminate the shift and to move the adjustable member out of blocking adjustment.

3. In a calculating machine having a fixed frame, a carriage transversely shiftable relative to said frame, a power train operable forwardly or alternatively reversely to shift the carriage into one or into the other extreme position, a product dividend register shiftable with said carriage by said shift train, rotary differential actuators on said frame, intermediate gears between said actuators and the product dividend register, and a counting finger on said frame driven in time with the actuators; multiplier storage wheels on said carriage denominationally shiftable therewith into successive operative relation with said counting finger and provided with gears normally located out of mesh with the intermediate actuator gears, a normally inoperative carriage displacing train including a cam driven in timed relation with the rotation of the differential actuators, a contact member on the carriage located, in one extreme shifted position of the carriage, in the path of movement of said displacing train and operable by said cam to displace the carriage and thereby mesh the multiplier storage gears with the intermediate actuator gears, manually operable setup devices, means operable by said setup devices to adjust the displacing train into operative position, means including a spring urged element settable by the setup devices to initiate actuator rotation, a member adjustable by the setup devices to block the spring urged initiating element from operation, connections operable by the setup devices to initiate operation of said power train, a member settable to determine forward or alternatively reverse operation of said power train, and means operable in response to movement of the carriage into the last mentioned extreme shifted position to terminate the shift and to move the adjusable member out of blocking adjustment.

4. In a calculating machine having a fixed frame, a carriage transversely shiftable relative to said frame, a power train operable to shift the carriage into one extreme position, a product dividend register shiftable with said carriage by said shift train, rotary differential actuators on said frame, intermediate gears between said actuators and the product dividend register, a multiplier quotient register, and a counting finger on said frame driven in time with the actuators; multiplier storage wheels on said carriage denominationally shiftable therewith into successive operative relation with said counting finger and provided with gears normally located out of mesh with the intermediate actuator gears, a cam operable in said one extreme shifted position of the carriage to displace said carriage and thereby mesh the multiplier storage gears with the intermediate actuator gears, normally disabled means for driving said cam in timed relation with the rotation of the differential actuators including an element adjustable to enable said drive means, a clear key, clearout means including a power train activated by said clear key and operable to clear out values registered in said multiplier quotient register, a setup key, means operable upon manipulation of said set-up key to adjust said element to enable said cam driving means, a normally inoperative shift initiating arm associated with the carriage shift train, means operable in response to manipulation of the setup key to adjust said arm into operative position, connections operable by the clearout means to effect shift initiating movement of said arm, means operable in response to movement of the carriage into said extreme shifted position to terminate the shift, and means conditioned upon manipulation of said set-up key and operable in response to movement of the carriage into said extreme shifted position to initiate actuator rotation.

5. In a calculating machine having a fixed frame, a main carriage mounted on and transversely shiftable relative to said frame, a product dividend register on said carriage, a cyclically driven reversible differential actuators on said frame, and intermediate gears between said actuators and the product dividend register; a sub-carriage mounted upon and longitudinally shiftable relatively to the main carriage, multiplier storage wheels on said subcarriage and provided with gears, spring means normally holding said subcarriage in position with the multiplier storage gears out of mesh with the intermediate actuator gears, setup means including a driving element driven in timed relation with the differential actuator cycle, normally inactive adjustable cycle control devices operable to control operation of the differential actuators, a key, a lever operable in response to manipulation of said key to operate the cycle control devices to initiate a single additive cycle of the differential actuators and thereupon to adjust said devices into active position relative to the driving element, said driving element being operable upon completion of the additive cycle to operate the adjusted cycle control devices to effect a single subtractive cycle of the differential actuators, and a cam operable by the driven cycle control devices and effective thereupon in one extreme shifted position of the main carriage, to hold the subcarriage displaced, against the tension of its spring, with the multiplier storage gears in mesh with the intermediate actuator gears.

6. In a calculating machine having a fixed frame, a main carriage mounted on and transversely shiftable relative to said frame, a product dividend register on said carriage, cyclically driven reversible differential actuators on said frame, intermediate gears between said actuators and the product dividend register, digit keys settable to maintain values in the differential actuators, and releasing means for said keys; a subcarriage mounted upon and longitudinally shiftable relatively to the main carriage, multiplier storage wheels on said subcarriage and provided with gears, spring means normally holding said subcarriage in position with the multiplier storage gears out of mesh with the intermediate actuator gears, normally inactive adjustable cycle control devices operable to control operation of the differential actuators including an element movable to initiate additive operation of said actuators, normally ineffective drive means for said control devices driven in timed relation with the differential actuator cycle, a set-up key, means operable in response to manipulation of said set-up key to move said element to initiating position and to adjust said control devices into active driven relationship with said drive means, means cooperating with the driven cycle control devices to terminate the additive operation of the differential actuators after a single cycle and thereafter to effect a single subtractive cycle thereof, a cam operable by the driven cycle control devices and effective thereupon in one extreme shifted position of the main carriage to displace and then to hold the subcarriage against the tension of its spring, with the multiplier storage gears in mesh with the intermediate actuator gears, nonrepeat means settable by the setup key to operate the digit key releasing means, a contact member on the main carriage, and means operable by said contact member, with the main carriage in extreme shifted position to disable the nonrepeat means during the additive cycle of the actuators.

7. In a calculating machine having a fixed frame, a main carriage mounted on and transversely shiftable relative to said frame, a product dividend register on said carriage, cyclically driven reversible differential actuators on said frame, intermediate gears between said actuators and the product dividend register, digit keys settable to maintain values in the differential actuators, and automatic releasing means for said keys comprising a non-repeat train; a sub-carriage mounted upon and longitudinally shiftable relatively to the main carriage, multiplier storage wheels on said subcarriage and provided with gears, spring means normally holding said subcarriage in position with the multiplier storage gears out of mesh with the intermediate actuator gears, setup means including a driving element driven in timed relation with the differential actuator cycle, normally inactive adjustable cycle control devices operable to control operation of the differential actuators, a key, a lever operable in response to manipulation of said key to operate the cycle control devices to initiate a single additive cycle of the differential actuators and thereupon to adjust said devices into active position relative to the driving element, said driving element being operable upon completion of the additive cycle to drive the adjusted cycle control devices to effect a single subtractive cycle of the differential actuators, a cam operable by the driven cycle control devices and effective thereupon in one extreme shifted position of the main carriage, to hold the sub-carriage displaced, against the tension of its spring, with the multiplier storage gears in mesh with the intermediate actuator gears, a contact member on the main carriage, and a lever interposed in the nonrepeat train and settable jointly by said contact member, with the main carriage in extreme shifted position, and by the cycle control devices to disable the nonrepeat devices, said driven cycle control devices acting during the subtractive cycle of the differential actuators to release the interposed lever from its set disabling position.

8. In a calculating machine having a fixed frame, a main carriage mounted on and transversely shiftable relative to said frame, a product dividend register on said carriage, cyclically driven reversible differential actuators on said frame, intermediate gears between said actuators and the product dividend register, digit keys settable to maintain values in the differential actuators, and automatic releasing means for said keys comprising a non-repeat train; a sub-carriage mounted upon and longitudinally shiftable relatively to the main carriage, multiplier storage wheels on said subcarriage and provided with gears, spring means normally holding said subcarriage in position with the multiplier storage gears out of mesh with the intermediate actuator gears, normally inactive adjustable cycle control devices operable to control operation of the differential actuators including an element movable to initiate additive operation of said actuators, normally ineffective drive means for said control devices driven in timed relation with the differential actuator cycle, a set-up key, means operable in response to manipulation of said setup key to move said element to initiating position and to adjust said control devices into active driven relationship with said drive means, means cooperating with the driven cycle control devices to terminate the additive operation of the differential actuators after a single cycle thereof and thereafter to effect a single subtractive cycle thereof, a cam operable by the driven cycle control devices to displace and then to hold the subcarriage, against the tension of its spring, with the multiplier storage gears in mesh with the intermediate actuator gears, nonrepeat means settable by the setup key to operate the non-repeat train, a lever interposed in the nonrepeat train and settable by the cycle control devices to disable the key releasing means, said driven cycle control devices acting during the subtractive cycle of the differential actuators to release the interposed lever from its set disabling position, and a lever operable by the setup key and acting to hold the interposed lever in its disabling position while the setup key is held depressed.

9. In a calculating machine having a fixed frame, a carriage transversely shiftable relative to said frame, means for shifting said carriage to a plurality of intermediate ordinal positions and to an end position, a product dividend register shiftable with said carriage, differential actuators on said frame, intermediate gears between said actuators and the product dividend register, and a counting finger on said frame driven in time with the actuators; multiplier storage wheels on said carriage denominationally shiftable therewith into successive operative relation with said counting finger and provided with gears normally located out of mesh with the intermediate actuator gears, a normally disabled carriage displacing train operable in timed relation with the movement of the differential actuators including an element adjustable to enable said train, a contact member on the carriage located out of the path of movement of the displacing train when said carriage is in one of said intermediate positions and movable into the path of movement of said train upon shift of said carriage into said end position thereby rendering said train operable to displace said carriage transversely from said end position to mesh the multiplier storage gears with the intermediate actuator gears, a set-up key, and means operable upon manipulation of said key to adjust said element to enabling position and to initiate operation of the differential actuators.

10. In a calculating machine having a fixed frame, a carriage supported on and transversely shiftable relative to said frame, means for shifting said carriage to a plurality of intermediate ordinal positions and an end position, differential actuators on said frame, a product register on said carriage and provided with gears, and intermediate gears normally connecting said actuators with the product dividend register gears; multiplier storage wheels on said carriage and provided with gears normally located out of mesh with the intermediate actuator gears, a normally disabled carriage displacing train driven in timed relation with the movement of the differential actuators including an element adjustable to enable said train, a contact member on the carriage located out of the path of movement of the displacing train when said carriage is in an intermediate shifted position and movable into the path of movement of said train upon shift of said carriage into said end position thereby rendering said train operable to displace said carriage transversely from said end position to mesh the multiplier storage gears with the intermediate actuator gears and to unmesh the product dividend register gears from said intermediate gears, a set-up key, and means operable upon manipulation of said key to adjust said element to enabling position and to initiate operation of the differential actuators.

11. In a calculating machine having a fixed frame, a carriage transversely shiftable relative to said frame, a product dividend register shiftable with said carriage, differential actuators on said frame, intermediate gears between said actuators and the product dividend register, and a counting finger on said frame driven in time with the actuators; multiplier storage wheels on said carriage denominationally shiftable therewith into successive operative relation with said counting finger and provided with gears normally located out of mesh with the intermediate actuator gears, a normally disabled carriage displacing train operable in timed relation with the movement of the differential actuators including an element adjustable to enable said train, a set-up key, means operable upon manipulation of said key to adjust said element to enabling position and to initiate operation of the differential actuators, and a contact member on the carriage located, in one extreme shifted ordinal position of said carriage, in the path of movement of said displacing train and operable thereby to displace said carriage to mesh the multiplier storage gears with the intermediate actuator gears.

12. In a calculating machine having a fixed frame, a main carriage mounted on and transversely shiftable relative to said frame, a power train operable to shift the carriage into a given position, a product dividend register on said carriage, cyclically driven reversible differential actuators on said frame, and intermediate gears between said actuators and the product dividend register; a sub-carriage mounted upon and longitudinally shiftable relative to the main carriage, multiplier storage wheels on said sub-carriage and provided with gears, spring means normally holding said sub-carriage in position with the multiplier storage gears out of mesh with the intermediate actuator gears, normally inactive adjustable cycle control devices operable to control operation of the differential actuators including an element movable to initiate additive operation of said actuators, normally ineffective drive means for said control devices driven in timed relation with the differential actuator cycle, spring powered means operable to move said element to initiating position and to adjust said control devices into active driven relationship with said drive means, a latch for restraining said spring powered means, a set-up key for releasing said latch, means cooperating with the driven cycle control devices to terminate the additive operation of the differential actuators after a single cycle and thereafter to effect a single subtractive cycle thereof, a cam operable by the driven cycle control devices and effective thereupon to displace and then hold the sub-carriage, against the tension of its spring, with the multiplier storage gears in mesh with the intermediate actuator gears, a member adjustable to block said element from said initiating movement upon manipulation of said set-up key thereby holding the operation of said spring powered means in abeyance, normally ineffective adjustable shift initiating means associated with said carriage shift train, means responsive to manipulation of said set-up key to adjust said shift initiating means to effective position and thereupon initiate a carriage shift operation, and means operable in response to movement of the main carriage into said given position to terminate the shift and to move said blocking member from blocking position.

HERMAN GANG.

REFERENCES CITED

The following references are of record in the file of this patent:

UNITED STATES PATENTS

| Number | Name | Date |
|---|---|---|
| 1,964,211 | Overbury | June 26, 1934 |
| 1,973,437 | Kottmann | Sept. 11, 1934 |
| 2,201,713 | Britten, Jr. | May 21, 1940 |
| 2,309,240 | Chase | Jan. 26, 1943 |
| 2,382,661 | Pott | Aug. 14, 1945 |
| 2,408,097 | Pott | Sept. 24, 1946 |

FOREIGN PATENTS

| Number | Country | Date |
|---|---|---|
| 337,607 | Great Britain | Nov. 6, 1930 |

Certificate of Correction

Patent No. 2,531,206                                                        November 21, 1950

HERMAN GANG

It is hereby certified that error appears in the printed specification of the above numbered patent requiring correction as follows:

Column 15, line 70, for the word "other" read *order*;

and that the said Letters Patent should be read as corrected above, so that the same may conform to the record of the case in the Patent Office.

Signed and sealed this 20th day of February, A. D. 1951.

[SEAL]

THOMAS F. MURPHY,
*Assistant Commissioner of Patents.*